US012641680B2

(12) United States Patent (10) Patent No.: US 12,641,680 B2

Fujishiro et al. (45) Date of Patent: May 26, 2026

(54) COMMUNICATION CONTROL METHOD FOR MULTICAST BROADCAST SERVICE

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 378 days.

(21) Appl. No.: 18/350,599

(22) Filed: Jul. 11, 2023

(65) Prior Publication Data

US 2023/0354475 A1 Nov. 2, 2023

Related U.S. Application Data

(63) Continuation of application No. PCT/JP2022/000642, filed on Jan. 12, 2022.

(60) Provisional application No. 63/136,486, filed on Jan. 12, 2021.

(51) Int. Cl.
H04W 4/00 (2018.01)
H04W 4/06 (2009.01)
H04W 76/40 (2018.01)

(52) U.S. Cl.
CPC ............. H04W 76/40 (2018.02); H04W 4/06 (2013.01)

(58) Field of Classification Search
CPC ...................................................... H04W 4/06
See application file for complete search history.

(56) References Cited

U.S. PATENT DOCUMENTS

| 12,520,380 B2 * | 1/2026 | Dai ........................ H04W 76/40 |
| 2021/0068004 A1 * | 3/2021 | Kadiri ............... H04W 28/0263 |
| 2021/0120526 A1 * | 4/2021 | Zhu ........................ H04W 72/30 |
| 2021/0185566 A1 * | 6/2021 | Zhu ......................... H04W 4/70 |
| 2023/0040690 A1 * | 2/2023 | Chen ..................... H04W 72/30 |
| 2023/0353986 A1 * | 11/2023 | Mohammed Mikaeil .................... H04W 4/06 |
| 2024/0023191 A1 * | 1/2024 | Dai ........................ H04W 76/27 |

FOREIGN PATENT DOCUMENTS

EP 3 349 487 A1 7/2018

OTHER PUBLICATIONS

3rd Generation Partnership Project; Technical Specification Group Radio Access Network; NR; NR and NG-RAN Overall Description; Stage 2 (Release 16); 3GPP TS 38.300 V16.3.0; Sep. 2020; pp. 1-148.

(Continued)

*Primary Examiner* — Elisabeth Benoit Magloire
(74) *Attorney, Agent, or Firm* — Studebaker Brackett PLLC

(57) ABSTRACT

A communication control method according to an embodiment is a communication control method used in a mobile communication system for providing a multicast broadcast service (MBS) from a base station to a user equipment, the communication control method including transmitting, by the base station through broadcast signaling, an MBS configuration including at least information used for reception of a broadcast session; and transmitting, by the base station to the user equipment in a Radio Resource Control (RRC) connected state, at least a part of the MBS configuration through dedicated signaling.

9 Claims, 19 Drawing Sheets

(56) References Cited

OTHER PUBLICATIONS

Kyocera; "Consideration of control plane aspects for NR MBS"; Online; 3GPP TSG-RAN WG2 #112-e, R2-2010234; Nov. 2-13, 2020; Total 8 pages.
Intel Corporation; "MBS L2 Architecture, user plane and control plane"; Electronic Meeting; 3GPP TSG-RAN WG2 Meeting #112-e, R2-2009196; Nov. 2-13, 2020; Total 11 pages.
CATT, CBN; "Further Discussion on MBS Idle Mode Support"; Electronic Meeting; 3GPP TSG RAN WG2#112-e, R2-2008797; Nov. 2-13, 2020; Total 11 pages.
VIVO, "Overview of NR MBS", 3GPP TSG-RAN WG2 Meeting #111 electronic, R2-2007033, E-Meeting, Aug. 18-28, 2020, total 12 pages.

* cited by examiner

|  | Delivery mode 1 | Delivery mode 2 |
|---|---|---|
| Intended for | Multicast sessions<br><br>(High QoS requirement) | Broadcast sessions<br><br>(Low QoS requirement) |
| Reception in | Connected | Connected<br><br>IDLE/INACTIVE |
| Configuration signalling by | RRC Reconfiguration | BCCH<br><br>(MCCH) |

FIG. 7 gNB 200

UE 100
(RRC CONNECTED STATE)

S11

MII

S12

DEDICATED SIGNALING (INCLUDING MBS CONFIGURATION)

S13

RESPONSE MESSAGE

S14

MBS TRAFFIC (MTCH)

COMMUNICATION CONTROL METHOD FOR MULTICAST BROADCAST SERVICE

RELATED APPLICATIONS

The present application is a continuation based on PCT Application No. PCT/JP2022/000642, filed on Jan. 12, 2022, which claims the benefit of US Provisional Patent Application No. 63/136,486 filed on Jan. 12, 2021. The content of which is incorporated by reference herein in their entirety.

TECHNICAL FIELD

The present disclosure relates to a communication control method used in a mobile communication system.

BACKGROUND OF INVENTION

In recent years, a mobile communication system of the fifth generation (5G) has attracted attention. New Radio (NR), which is a Radio Access Technology (RAT) of the 5G System, has features such as high speed, large capacity, high reliability, and low latency compared to Long Term Evolution (LTE), which is a fourth-generation radio access technology.

CITATION LIST

Non-Patent Literature

Non-Patent Document 1: 3GPP Technical Specification "3GPP TS 38.300 V16.3.0 (2020-09)"

SUMMARY

A communication control method according to a first aspect is a communication control method used in a mobile communication system for providing a multicast broadcast service (MBS) from a base station to a user equipment, the communication control method including transmitting, by the base station through broadcast signaling, an MBS configuration including at least information used for reception of a broadcast session; and transmitting, by the base station to the user equipment in a Radio Resource Control (RRC) connected state, at least a part of the MBS configuration through dedicated signaling.

A communication control method according to a second aspect is a communication control method used in a mobile communication system for providing a multicast broadcast service (MBS) from a base station to a user equipment, the communication control method including transmitting, by the base station to the user equipment, mode specification information specifying one of a first delivery mode and a second delivery mode as a delivery mode related to the MBS. The first delivery mode is a delivery mode where an MBS configuration used for MBS reception is transmitted from the base station to the user equipment through dedicated signaling, and the second delivery mode is a delivery mode where the MBS configuration is transmitted from the base station to the user equipment through broadcast signaling.

A communication control method according to a third aspect is a communication control method used in a mobile communication system for providing a multicast broadcast service (MBS) from a base station to a user equipment, the communication control method including transmitting, by the user equipment to the base station, an MBS interest notification message including MBS session information regarding a desired MBS session of the user equipment; and attempting, by the user equipment, reception of broadcast signaling including an MBS configuration used for reception of the MBS session when having determined not to receive, from the base station, dedicated signaling including the MBS configuration after transmitting the MBS interest notification message.

A communication control method according to a fourth aspect is a communication control method used in a mobile communication system for providing a multicast broadcast service (MBS) from a base station to a user equipment, the communication control method including attempting, by the user equipment, reception of broadcast signaling including an MBS configuration used for reception of a desired MBS session of the user equipment; and transmitting, by the user equipment to the base station, an MBS interest notification message including MBS session information regarding the desired MBS session when not receiving the broadcast signaling from the base station.

BRIEF DESCRIPTION OF THE DRAWINGS

FIG. 7 is a diagram illustrating delivery modes according to an embodiment.

DESCRIPTION OF EMBODIMENTS

Introduction of multicast broadcast services to the 5G system (NR) has been under study. NR multicast broadcast services are desired to provide enhanced services compared to LTE multicast broadcast services.

The present disclosure provides an improved multicast broadcast service.

A mobile communication system according to an embodiment is described with reference to the drawings. In the description of the drawings, the same or similar parts are denoted by the same or similar reference signs.

Configuration of Mobile Communication System

First, a configuration of a mobile communication system according to an embodiment is described.

Figure 1:
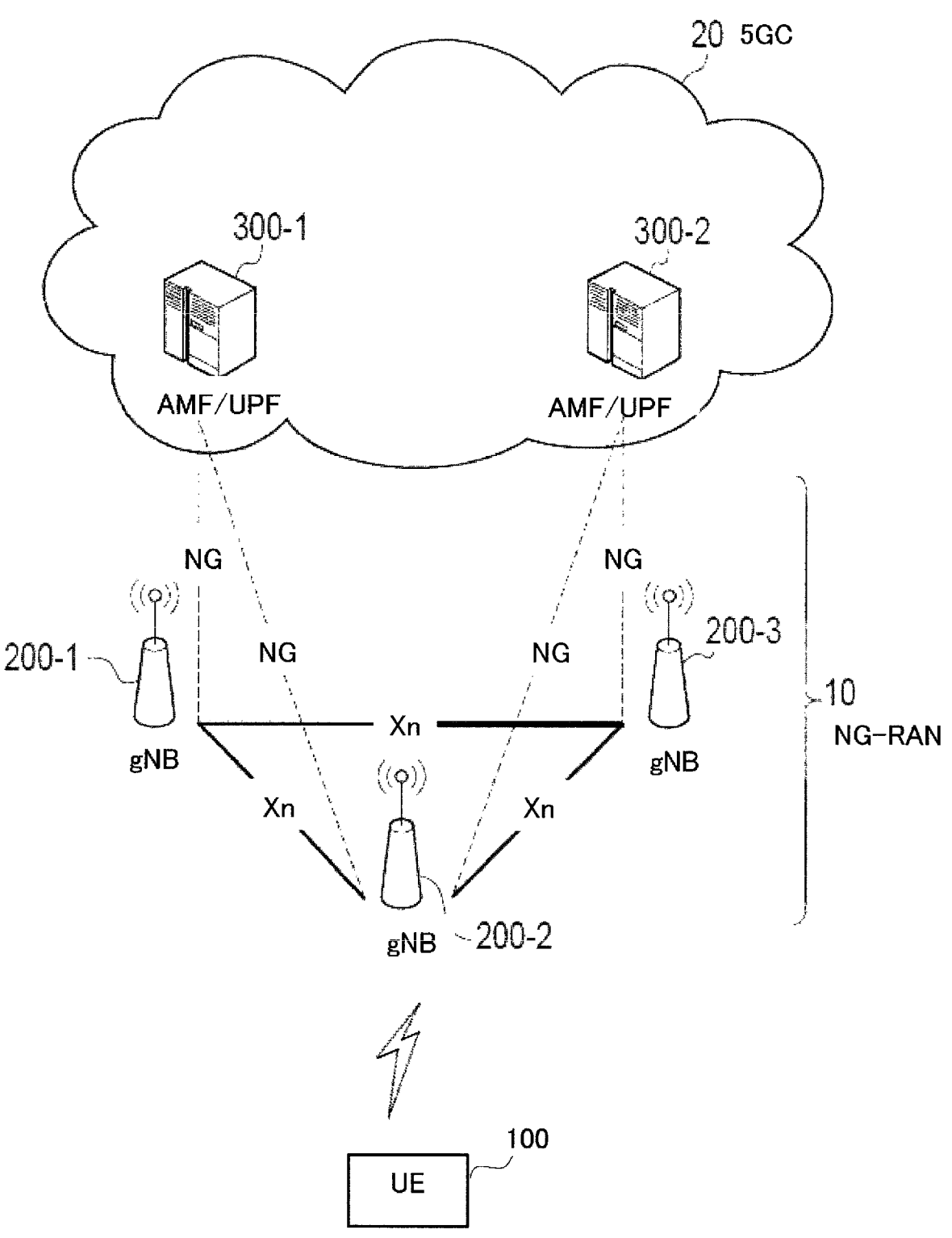
FIG. 1 is a diagram illustrating a configuration of a mobile communication system according to an embodiment.

FIG. 1 is a diagram illustrating a configuration of the mobile communication system according to an embodiment. This mobile communication system complies with the 5th Generation System (5GS) of the 3GPP standard. The description below takes the 5GS as an example, but the Long Term Evolution (LTE) system and/or the 6th generation (6G) system may be at least partially applied to the mobile communication system.

As illustrated in FIG. 1, the mobile communication system includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the UE 100 is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and/or the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
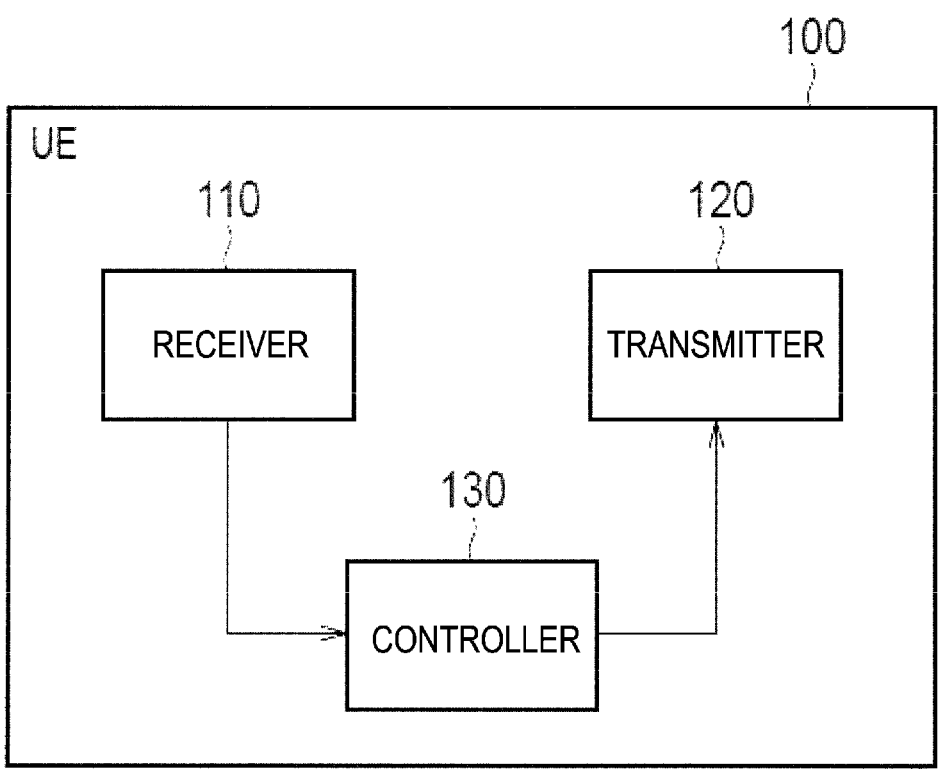
FIG. 2 is a diagram illustrating a configuration of a user equipment (UE) according to an embodiment.

FIG. 2 is a diagram illustrating a configuration of the user equipment (UE) 100 according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
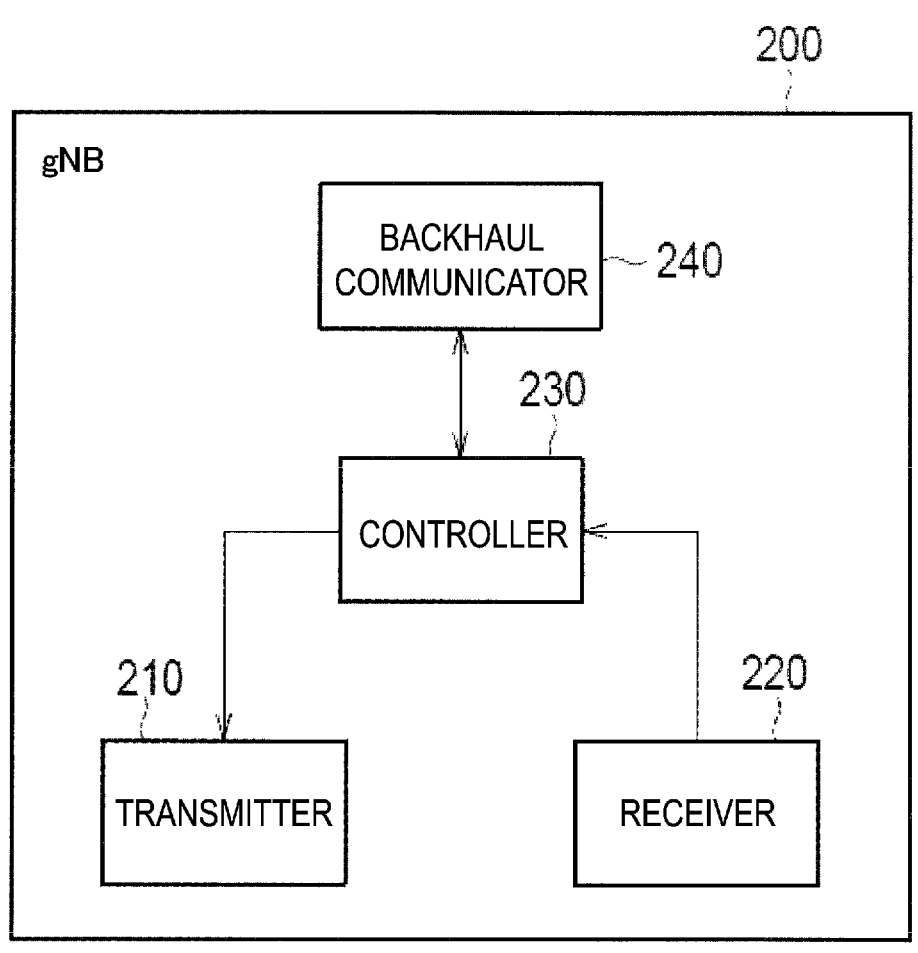
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
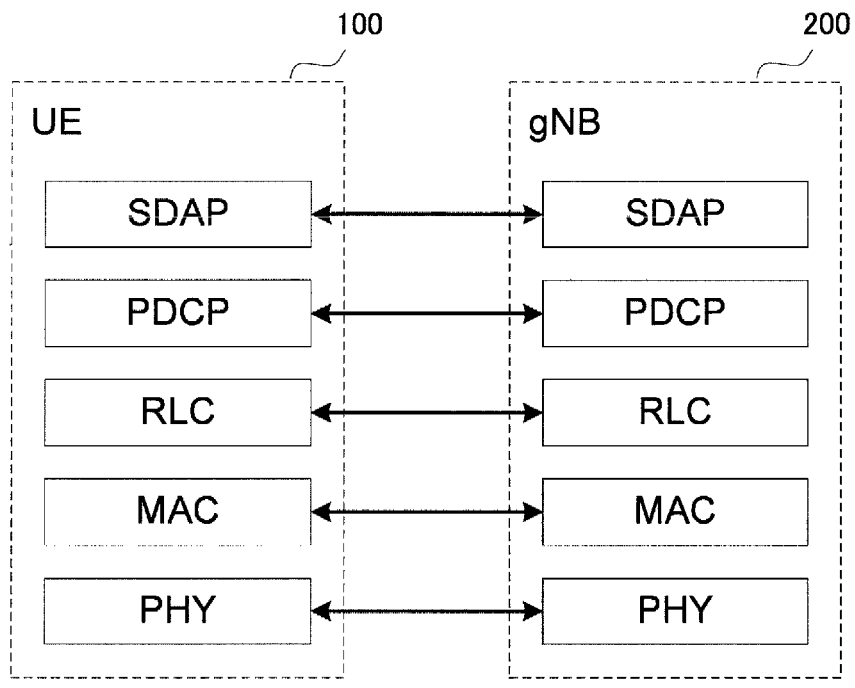
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink, and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 5:
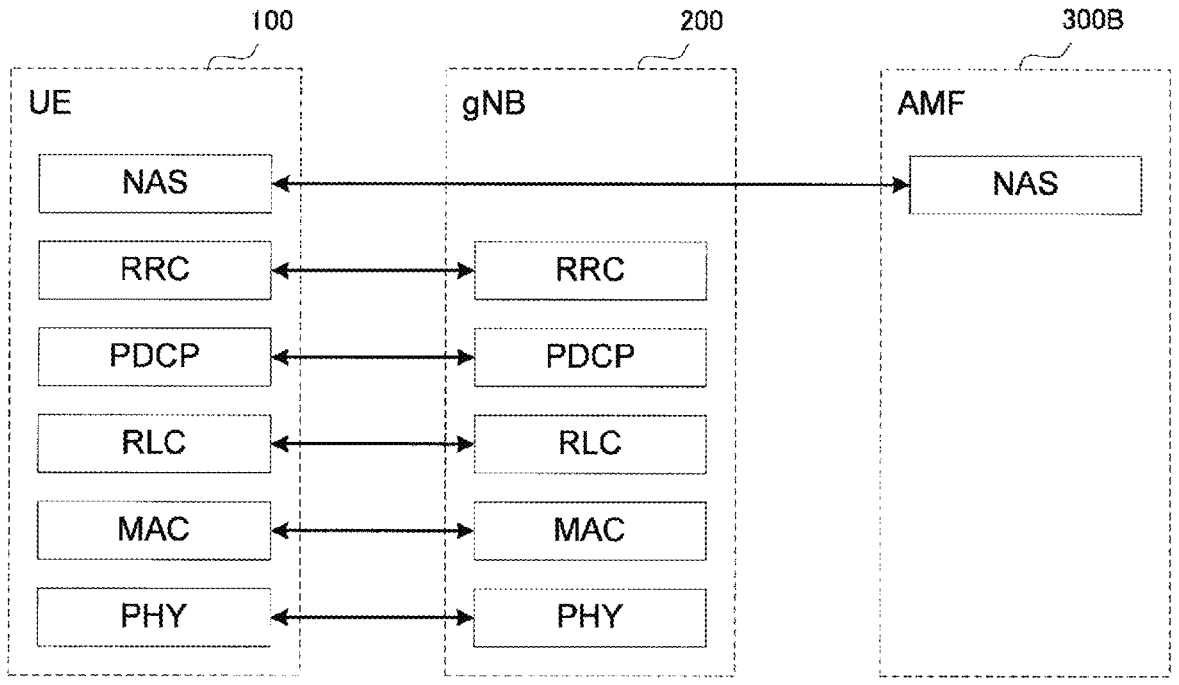
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (a control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned higher than the RRC layer performs session management, mobility management, and the like. NAS signaling is transmitted between the NAS layer of the UE 100 and the NAS layer of an AMF 300B.

Note that the UE 100 includes an application layer other than the protocol of the radio interface.

MBS

An MBS according to an embodiment is described.

The MBS is a service in which the NG-RAN 10 can provide broadcast or multicast, i.e., Point To Multipoint (PTM) data transmission to the UE 100. Note that assumed use cases (service types) of the MBS include public safety communication, mission critical communication, Vehicle to Everything (V2X) communication, IPv4 or IPv6 multicast delivery, IPTV, group communication, and software delivery.

A broadcast service provides a service to every UE 100 within a particular service area for an application not requiring highly reliable QoS. An MBS session used for the broadcast service is referred to as a broadcast session.

A multicast service provides a service not to every UE 100, but to a group of UEs 100 participating in the multicast service. An MBS session used for the multicast service is referred to as a multicast session. The multicast service can provide the same content to the group of UEs 100 through a method with higher radio efficiency than the broadcast service.

Figure 6:
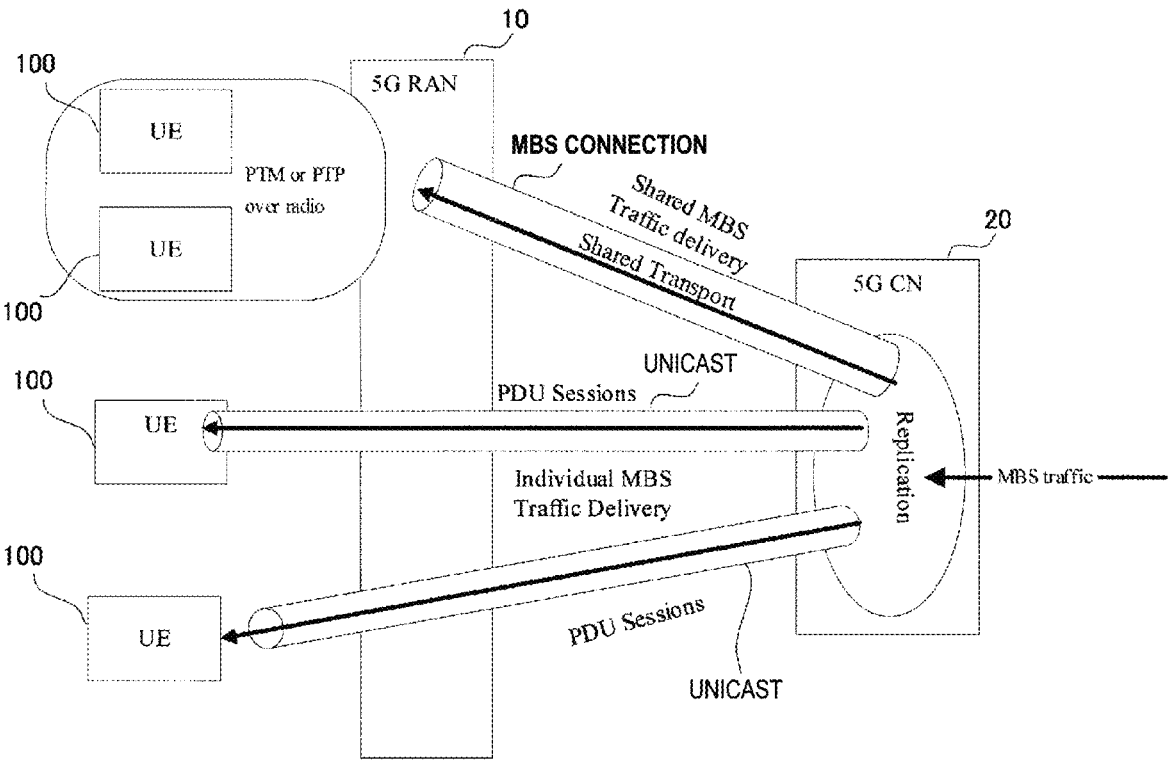
FIG. 6 is a diagram illustrating an overview of MBS traffic delivery according to an embodiment.

FIG. 6 is a diagram illustrating an overview of MBS traffic delivery according to an embodiment.

As illustrated in FIG. 6, MBS traffic is delivered from a single data source (application service provider) to a plurality of UEs. The 5G CN (5GC) 20, which is a 5G core network, receives the MBS traffic from the application service provider and performs Replication of the MBS traffic to deliver the replicated MBS traffic.

From the perspective of the 5GC 20, two multicast delivery methods are possible: 5GC Shared MBS Traffic delivery and 5GC Individual MBS Traffic delivery.

In the 5GC individual MBS traffic delivery method, the 5GC 20 receives a single copy of MBS data packets and delivers individual copies of these MBS data packets to the individual UEs 100 via Protocol Data Unit (PDU) sessions of the individual UEs 100. Thus, one PDU session for each UE 100 needs to be associated with a multicast session.

In the 5GC shared MBS traffic delivery method, the 5GC 20 first receives a single copy of MBS data packets and delivers the single copy of the MBS data packets to a RAN node (i.e., gNB 200). Second, the gNB 200 delivers the single copy to one or more of the UEs 100.

From the perspective of the RAN (5G RAN) 10, two delivery methods are possible for radio transmission of the MBS traffic in the 5GC shared MBS traffic delivery method: a Point-to-Point (PTP) delivery method and a Point-to-Multipoint (PTM) delivery method.

In the PTP delivery method, the gNB 200 wirelessly delivers the individual copies of the MBS data packets to the individual UEs 100. On the other hand, in the PTM delivery method, the gNB 200 wirelessly delivers the single copy of the MBS data packets to a group of the UEs 100. The gNB 200 dynamically determines whether to use the PTM or PTP delivery method as a method for delivering the MBS traffic to one UE 100.

The PTP and PTM delivery methods are mainly related to the user plane. Modes for controlling the MBS traffic delivery include two delivery modes: a first delivery mode and a second delivery mode. FIG. 7 is a diagram illustrating delivery modes according to an embodiment.

As illustrated in FIG. 7, the first delivery mode (Delivery mode 1) is a delivery mode that can be used by the UE 100 in the RRC connected state, and is a delivery mode for high QoS requirements. The first delivery mode is used only for multicast sessions among MBS sessions. In an embodiment, the first delivery mode is assumed to be used for multicast sessions, but the first delivery mode may also be used for broadcast sessions. The first delivery mode may be available to the UE 100 in the RRC idle state or the RRC inactive state.

In an embodiment, an MBS reception configuration in the first delivery mode is performed through dedicated signaling (also referred to as "unicast signaling"). Specifically, the MBS reception configuration in the first delivery mode is performed through an RRC Reconfiguration message (or an RRC Release message), which is an RRC message unicast from the gNB 200 to the UE 100. In the first delivery mode, advanced MBS traffic delivery using a split MBS bearer described below is possible.

The MBS reception configuration includes MBS traffic channel information (hereinafter referred to as "MTCH information") about an MBS traffic channel carrying MBS traffic. The MTCH information includes MBS session information relating to an MBS session and scheduling information (hereinafter referred to as "MTCH scheduling information") of an MBS traffic channel corresponding to the MBS session.

Note that the MBS traffic channel is a type of logical channel and may be referred to as a Multicast Traffic Channel (MTCH). The MBS traffic channel is mapped to a Downlink Shared Channel (DL-SCH) being a type of transport channel.

The second delivery mode (Delivery mode 2) is a delivery mode that can be used not only by the UE 100 in the RRC connected state, but also by the UE 100 in the RRC idle state or the RRC inactive state, and is a delivery mode for low QoS requirements. The second delivery mode is used for broadcast sessions among MBS sessions. However, the second delivery mode may also be applicable to multicast sessions.

An MBS reception configuration in the second delivery mode is performed through broadcast signaling. Specifically, the MBS reception configuration in the second delivery mode is performed through a logical channel broadcast from the gNB 200 to the UEs 100, for example, a Broadcast Control Channel (BCCH) or a Multicast Control Channel (MCCH). Hereinafter, such a control channel may be referred to as an MBS control channel.

The network can provide different MBS services for different MBS sessions. The MBS session is identified by at least one selected from the group consisting of a Temporary Mobile Group Identity (TMGI), a session identifier, and a group Radio Network Temporary Identifier (RNTI). The TMGI and/or the session identifier is referred to as an MBS session identifier. The TMGI, the session identifier, and the group RNTI are collectively referred to MBS session information. The MBS session identifier may also be referred to as an MBS service identifier or a multicast group identifier.

Split MBS Bearer

A split MBS bearer according to an embodiment is described. The split MBS bearer is available in the first delivery mode described above.

The gNB 200 may configure an MBS bearer split into a PTP communication path and a PTM communication path (hereinafter referred to as a "split MBS bearer" as appropriate) for the UE 100. This allows the gNB 200 to dynamically switch transmission of the MBS traffic to the UE 100 between the PTP (PTP communication path) and the PTM (PTM communication path). The gNB 200 may perform duplication transmission of the same MBS traffic using both the PTP and the PTM to improve reliability. The gNB 200 may perform initial transmission of the MBS traffic to the plurality of UEs 100 in using PTM and perform retransmission of the MBS traffic to a specific UE 100 to improve reliability.

A predetermined layer terminating the split is the MAC layer (HARQ), the RLC layer, the PDCP layer, or the SDAP layer. Although an example in which the predetermined layer terminating the split is the PDCP layer will be mainly described below, the predetermined layer may be the MAC layer (HARQ), the RLC layer, or the SDAP layer.

Figure 8:
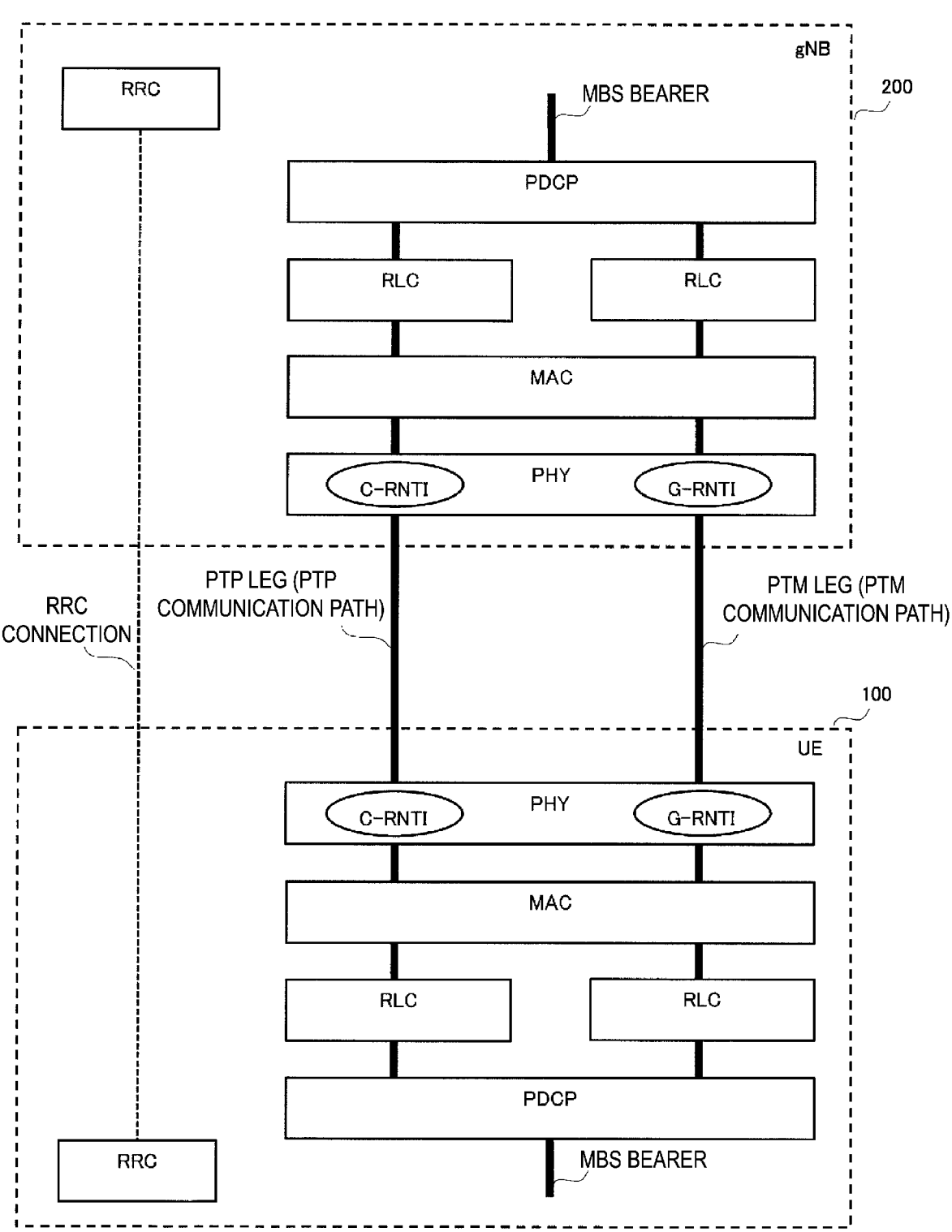
FIG. 8 is a diagram illustrating a split MBS bearer according to an embodiment.

FIG. 8 is a diagram illustrating the split MBS bearer according to an embodiment. Hereinafter, the PTP communication path is referred to as a PTP leg, and the PTM communication path is referred to as a PTM leg. A functional unit corresponding to each layer is referred to as an entity.

As illustrated in FIG. 8, each of the PDCP entity of the gNB 200 and the PDCP entity of the UE 100 splits an MBS bearer, which is a bearer (data radio bearer) used for the MBS, into a PTP leg and a PTM leg. Note that the PDCP entity is provided for each bearer.

Each of the gNB 200 and the UE 100 includes two RLC entities provided per leg: one MAC entity and one PHY entity. The PHY entity may be provided per leg. Note that, in a Dual Connectivity in which the UE 100 communicates with two gNBs 200, the UE 100 may include two MAC entities.

The PHY entity transmits and receives data of the PTP leg using a cell RNTI (Cell Radio Network Temporary Identifier (C-RNTI)) that is allocated to the UE 100 on a one-to-one basis. The PHY entity transmits and receives data of the PTM leg using a group RNTI (Group Radio Network Temporary Identifier (G-RNTI)) allocated to the MBS session on a one-to-one basis. The C-RNTI is different for each UE 100, but the G-RNTI is an RNTI common to a plurality of UEs 100 receiving one MBS session.

For PTM transmission of the MBS traffic (multicast or broadcast) from the gNB 200 to the UE 100 using the PTM leg, the split MBS bearer needs to be established for the UE 100 from the gNB 200, and the PTM leg needs to be activated. In other words, even if the split MBS bearer is established for the UE 100, when the PTM leg is in a deactivation state, the gNB 200 cannot perform the PTM transmission of the MBS traffic using the PTM leg.

In order for the gNB 200 and the UE 100 to perform PTP transmission (unicast) of the MBS traffic using the PTP leg, the split MBS bearer needs to be established for the UE 100 from the gNB 200, and the PTP leg needs to be activated. In other words, even if the split MBS bearer is established for the UE 100, when the PTP leg is in a deactivation state, the gNB 200 cannot perform the PTP transmission of the MBS traffic using the PTP leg.

When the PTM leg is in an activated state, the UE 100 monitors a Physical Downlink Control Channel (PDCCH) to which a G-RNTI associated with the MBS session is applied (i.e., performs blind decoding of the PDCCH using the G-RNTI). The UE 100 may monitor the PDCCH only at a scheduling occasion of the MBS session.

When the PTM leg is in a deactivated state, the UE 100 does not monitor a PDCCH to which a G-RNTI associated with the MBS session is applied (i.e., does not perform blind decoding of the PDCCH using the G-RNTI).

When the PTP leg is in an activated state, the UE 100 monitors a PDCCH to which a C-RNTI is applied. When Discontinuous Reception (DRX) in the PTP leg is configured, the UE 100 monitors a PDCCH for a configured OnDuration period. When a cell (frequency) associated with the MBS session is specified, the UE 100 may monitor a PDCCH for the cell even when the cell is deactivated.

When the PTP leg is in a deactivated state, the UE 100 may monitor a PDCCH to which a C-RNTI is applied in preparation for normal unicast downlink transmission of traffic other than the MBS traffic. However, when a cell (frequency) associated with an MBS session is specified, the UE 100 need not monitor a PDCCH for the MBS session.

Note that it is assumed that the above-described split MBS bearer is configured by use of an RRC message (for example, an RRC Reconfiguration message) transmitted by the RRC entity of the gNB 200 to the RRC entity of the UE 100.

Example of First Delivery Mode

An example of the first delivery mode will be described.

Figure 9:
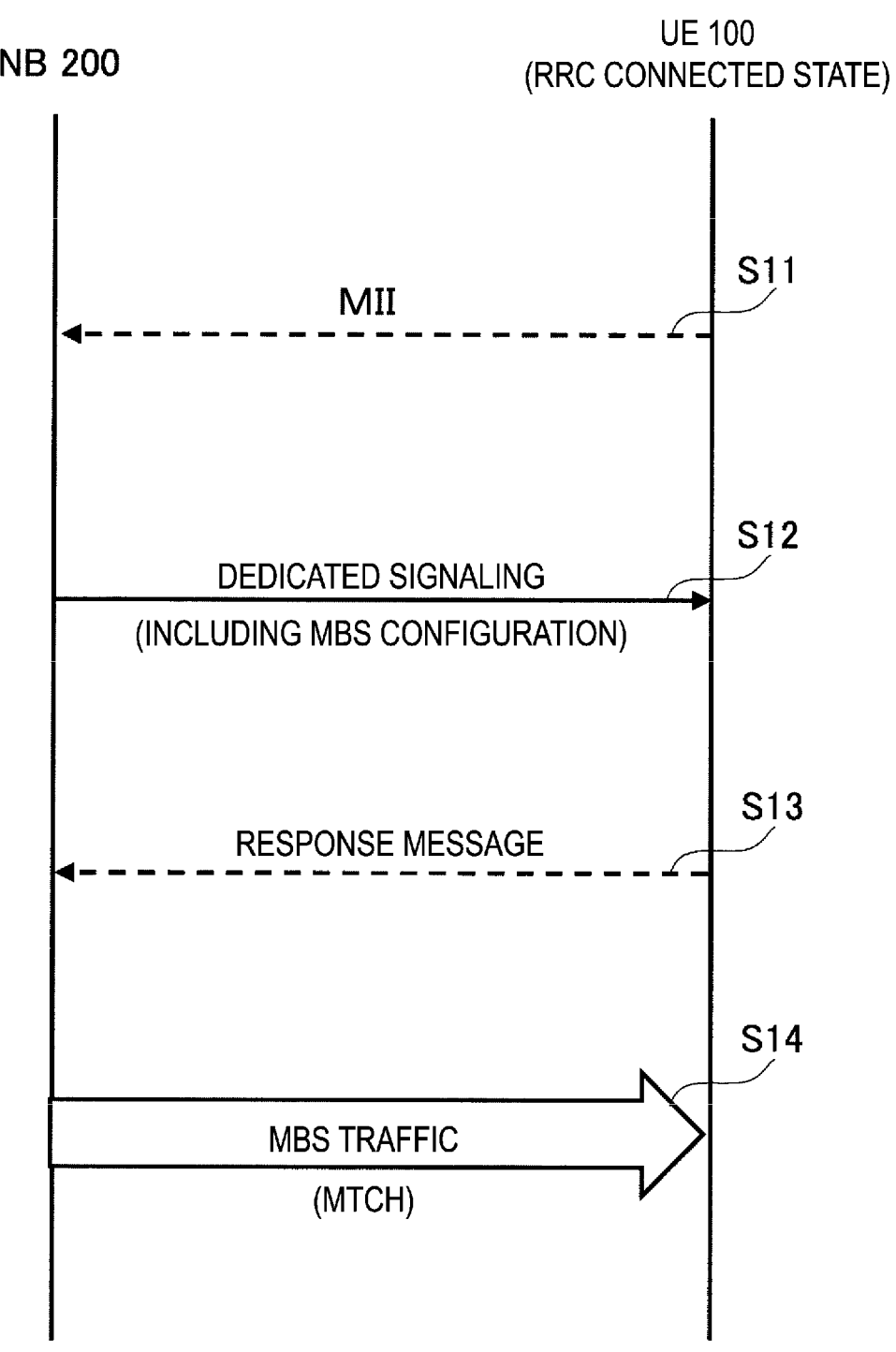
FIG. 9 is a diagram illustrating an operation example of a first delivery mode according to an embodiment.

FIG. 9 is a diagram illustrating an operation example of the first delivery mode according to an embodiment. In FIG. 9, optional steps are illustrated with dashed lines.

As illustrated in FIG. 9, in Step S11, the UE 100 in the RRC connected state transmits an MBS Interest Indication (MII) message to the gNB 200. The MII message includes MBS session information regarding a desired MBS session of the UE 100 (i.e., an MBS session that the UE 100 is interested in receiving). The gNB 200 recognizes the desired MBS session of the UE 100 by receiving the MII message. In this operation pattern, the MII message is a type of RRC message.

In Step S12, the gNB 200 transmits an MBS configuration used for reception of the desired MBS session of the UE 100 through dedicated signaling. In an embodiment, the dedicated signaling is an RRC Reconfiguration message. However, the dedicated signaling may be an RRC Release message.

In Step S13, the UE 100 transmits, to the gNB 200, a response message to the dedicated signaling received in Step S12. The response message is an RRC Reconfiguration Complete message, for example. The gNB 200 receives the response message.

In Step S14, the gNB 200 transmits (for example, multicasts) MBS traffic through the MTCH in accordance with the MBS configuration configured in Step S12. Here, the gNB 200 may perform advanced MBS traffic delivery using a split MBS bearer. The UE 100 receives the MBS traffic.

Figure 10:
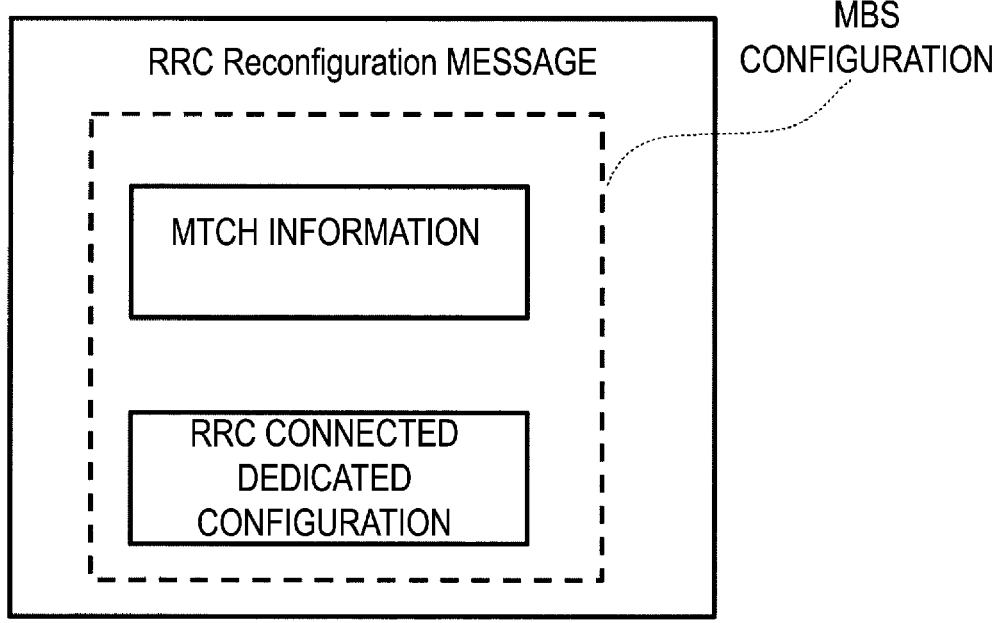
FIG. 10 is a diagram illustrating a configuration example of an RRC Reconfiguration message according to an embodiment.

FIG. 10 is a diagram illustrating a configuration example of an RRC Reconfiguration message according to an embodiment. As illustrated in FIG. 10, the RRC Reconfiguration message transmitted from the gNB 200 to the UE 100 includes an MBS configuration used for MBS reception as an information element.

The MBS configuration in the RRC Reconfiguration message includes MTCH information. The MBS configuration in the RRC Reconfiguration message may further include an RRC connected dedicated configuration applicable only to MBS reception in the RRC connected state.

The MTCH information may have a common configuration in all the RRC states (i.e., RRC connected state, RRC idle state, and RRC inactive state). The MTCH information includes MBS session information (the MBS session identifier and/or the group RNTI) and MTCH scheduling information. The MTCH scheduling information includes a transmission occasion and/or a transmission Bandwidth Part (BWP) of the MTCH.

Here, the group RNTI is an RNTI commonly assigned to the group of UEs 100. The transmission occasion is a candidate of a timing (for example, subframe) at which the gNB 200 transmits the MBS traffic using the MTCH. The transmission BWP is a BWP in which the gNB 200 transmits the MBS traffic using the MTCH. The BWP is a bandwidth part that is narrower than the frequency bandwidth of one cell and is for limiting the operating bandwidth of the UE 100.

On the other hand, the RRC connected dedicated configuration is a configuration related to the split MBS bearer or the like. The RRC connected dedicated configuration includes, for example, at least one selected from the group consisting of a bearer configuration of the split MBS bearer, a dynamic switching configuration between the PTP and the PTM, and a PTP leg configuration. Note that the PTM leg configuration can be used in the RRC idle state or the RRC inactive state, and the MTCH information may thus include the PTM leg configuration. The RRC connected dedicated configuration may include an HARQ feedback configuration.

Example of Second Delivery Mode

Figure 11:
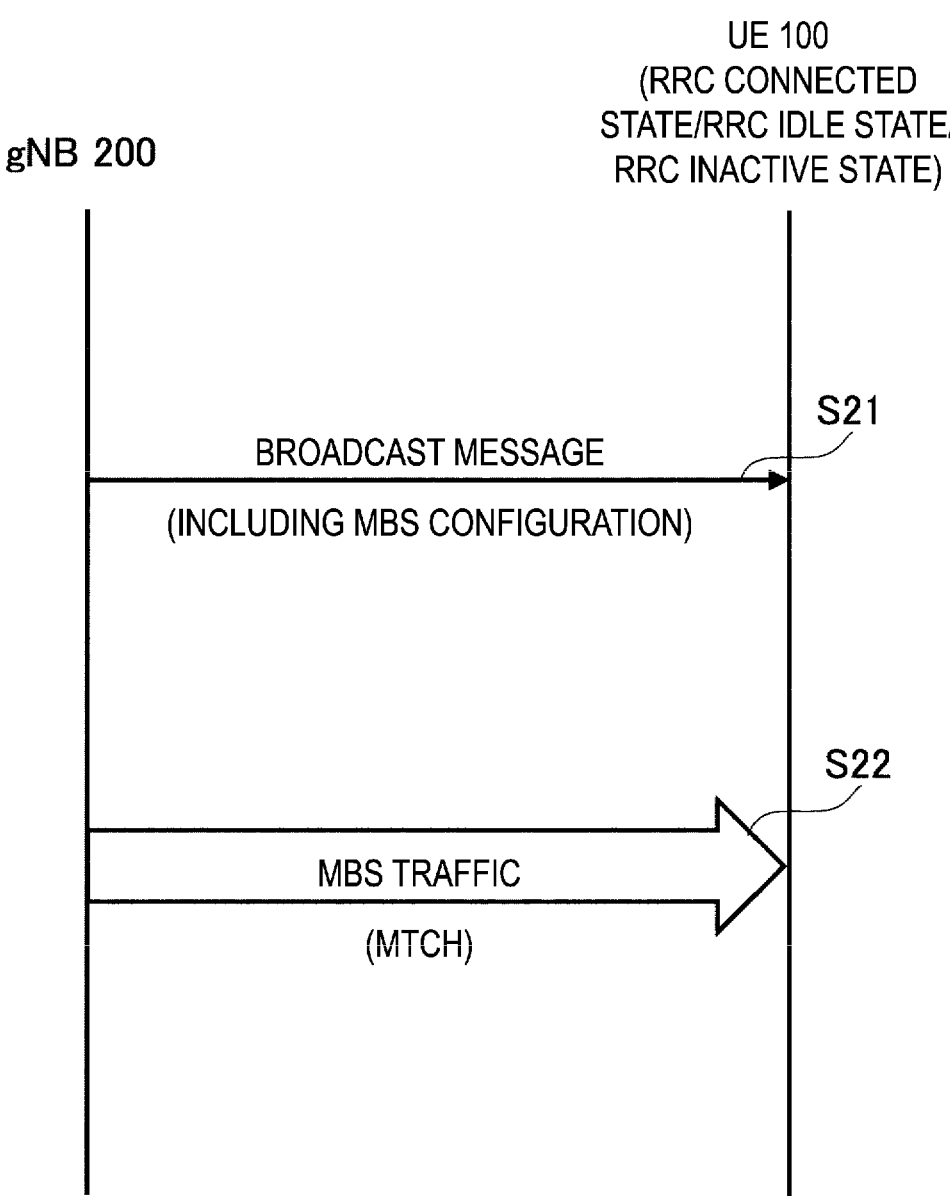
FIG. 11 is a diagram illustrating an operation example of a second delivery mode according to an embodiment.

An example of the second delivery mode will be described. FIG. 11 is a diagram illustrating an operation example of the second delivery mode according to an embodiment. In the second delivery mode, the UE 100 may be in an RRC state being any of the RRC connected state, the RRC idle state, and the RRC inactive state.

As illustrated in FIG. 11, in Step S21, the gNB 200 transmits an MBS configuration used for MBS reception through broadcast signaling. The broadcast signaling is signaling periodically transmitted through the BCCH and/or the MCCH. Hereinafter, an example in which the broadcast signaling is signaling transmitted through the MCCH will be mainly described. The UE 100 receives the broadcast signaling.

In Step S22, the gNB 200 transmits (for example, broadcasts) MBS traffic through the MTCH in accordance with the MBS configuration configured in Step S21. The UE 100 receives the MBS traffic.

Figure 12:
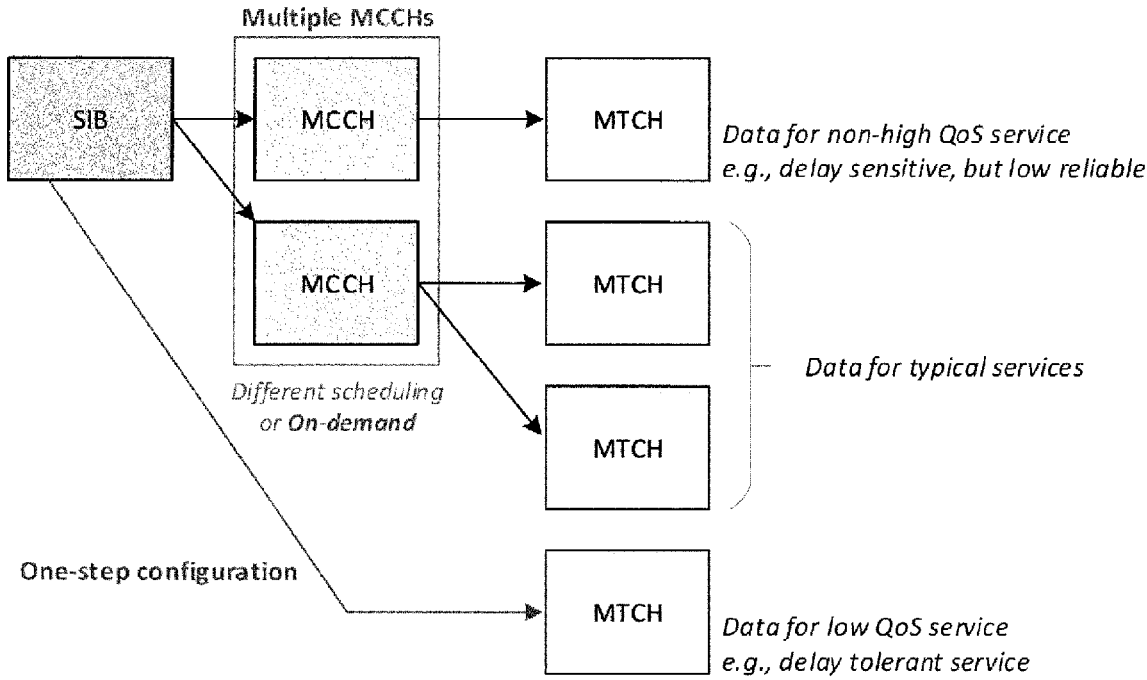
FIG. 12 is a diagram illustrating a variation of an MBS configuration of a second delivery mode according to an embodiment.

FIG. 12 is a diagram illustrating a variation of the MBS configuration in the second delivery mode according to an embodiment.

As illustrated in FIG. 12, the gNB 200 provides the scheduling information of the MCCH to the UE 100 using a system information block (SIB) transmitted through the BCCH. The UE 100 receives the MCCH (i.e., MBS configuration) based on the SIB received from the gNB 200 and receives the MTCH (i.e., MBS traffic) based on the received MCCH. Such a configuration may be referred to as a Two-step configuration.

The gNB 200 may provide the MBS configuration to the UE 100 using the SIB. In this case, the UE 100 receives the MTCH (i.e., MBS traffic) based on the SIB received from the gNB 200. Such a configuration may be referred to as a One-step configuration.

The gNB 200 may configure Multiple MCCHs in one cell of the gNB 200. The MCCHs may be different from each other in scheduling (for example, transmission cycle). Any of the MCCHs may be provided on demand upon request from the UE 100.

Figure 13:
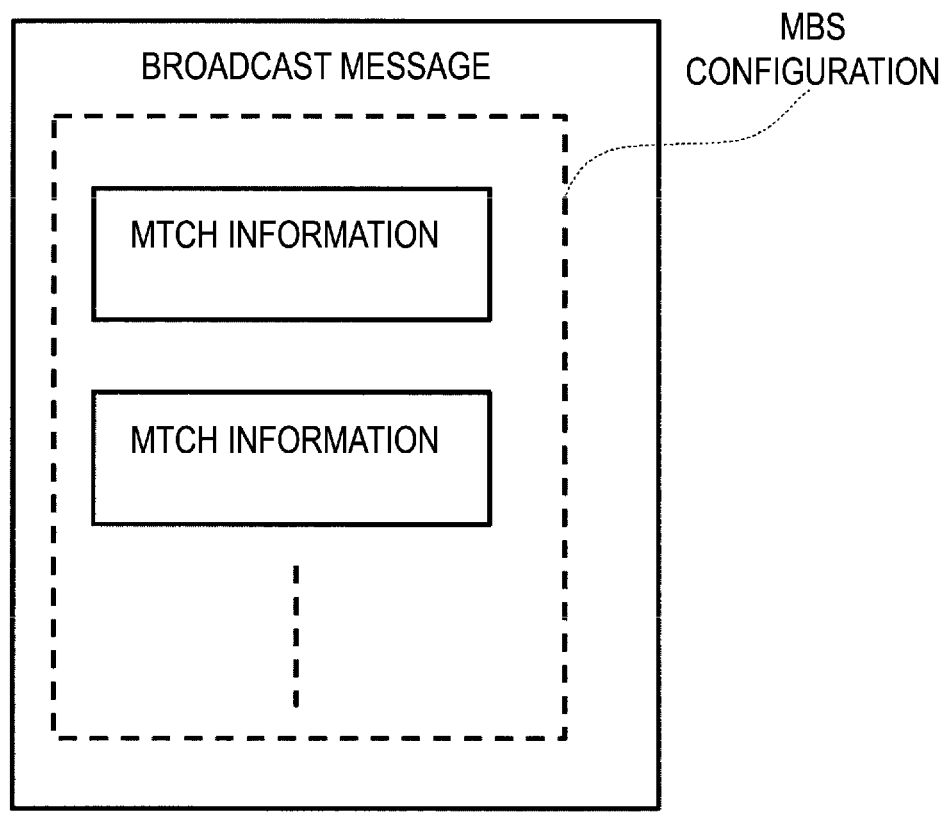
FIG. 13 is a diagram illustrating a configuration example of a broadcast message according to an embodiment.

FIG. 13 is a diagram illustrating a configuration example of a broadcast message according to an embodiment. The broadcast message corresponds to the broadcast signaling for providing an MBS configuration.

As illustrated in FIG. 13, the broadcast message transmitted from the gNB 200 to the UE 100 includes an MBS configuration used for MBS reception as an information element.

The MBS configuration in the broadcast message includes one or more pieces of MTCH information. FIG. 13 illustrates an example in which the broadcast message includes a plurality of pieces of MTCH information corresponding to a plurality of MBS sessions (a plurality of MTCHs).

First Operation Pattern

A first operation pattern according to an embodiment will be described.

As described above, in the second delivery mode, the UE 100 can receive MBS traffic (i.e., MBS reception) in any of the RRC connected state, the RRC idle state, and the RRC inactive state. In the second delivery mode, the UE 100 needs to monitor periodically transmitted broadcast signaling to perform the MBS reception.

However, when the UE 100 in the RRC connected state attempts to receive MBS traffic delivered in the second delivery mode, the UE 100 may need to interrupt unicast communication with the gNB 200 and periodically monitor the broadcast signaling, which is inefficient. There is also the concern of power consumption of the UE 100 increasing.

In the first operation pattern according to an embodiment, the gNB 200 transmits an MBS configuration (i.e., an MBS configuration of the second delivery mode) including at least information used for reception of a broadcast session through broadcast signaling. The gNB 200 transmits at least a part of the MBS configuration to the UE 100 in the RRC connected state through dedicated signaling.

As a result, even when the UE 100 in the RRC connected state attempts to receive the MBS traffic delivered in the second delivery mode, the UE 100 can acquire the MBS configuration without interrupting the unicast communication with the gNB 200. Thus, the problem as described above can be solved.

Specifically, the UE 100 in the RRC connected state performs the MBS reception using the MBS configuration transmitted through dedicated signaling without periodically monitoring the broadcast signaling.

Figure 14:
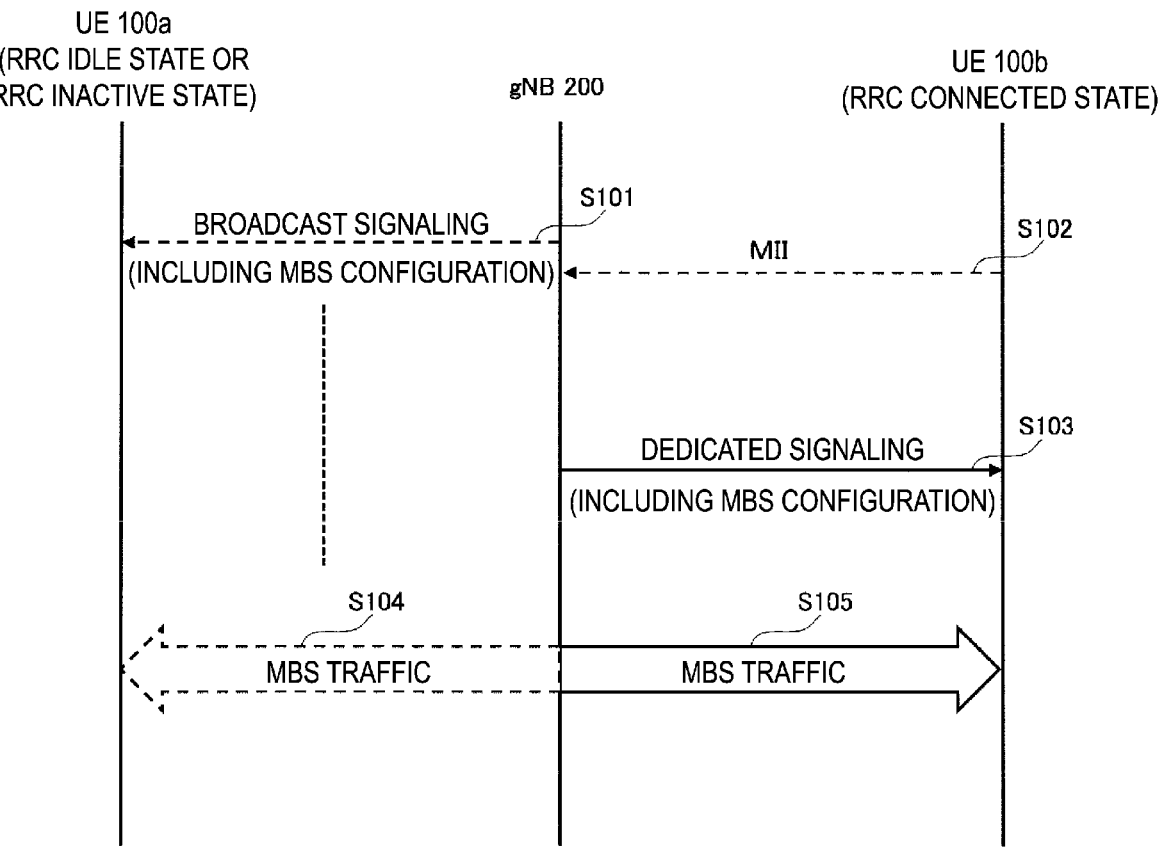
FIG. 14 is a diagram illustrating an operation example of a first operation pattern according to an embodiment.

FIG. 14 is a diagram illustrating an operation example of the first operation pattern according to an embodiment. In FIG. 14, optional steps are illustrated with dashed lines.

As illustrated in FIG. 14, in Step S101, the gNB 200 periodically transmits broadcast signaling including an MBS configuration. A UE 100*a* in the RRC idle state or the RRC inactive state receives the broadcast signaling.

In Step S102, a UE 100*b* in the RRC connected state transmits, to the gNB 200, an MII message including MBS session information regarding a desired MBS session of the UE 100*b*. The gNB 200 recognizes the desired MBS session of the UE 100*b* by receiving the MII message. The UE 100*b* may establish a session of the desired MBS session of the UE 100*b* at an upper layer (NAS) of the UE 100*b*. The AMF may establish a tunnel for the MBS session between the gNB 200 and the UPF.

In Step S103, the gNB 200 transmits an MBS configuration used for reception of the desired MBS session of the UE 100*b* through dedicated signaling (RRC Reconfiguration message). Here, the MBS configuration transmitted through dedicated signaling by the gNB 200 is at least a part of the MBS configuration transmitted through broadcast signaling by the gNB 200. The UE 100*b* receives the MBS configuration transmitted through dedicated signaling. Thus, the UE 100*b* does not need to periodically monitor the broadcast signaling.

In Step S103, the gNB 200 may include, in the dedicated signaling, notification information indicating that it is not necessary to monitor the broadcast signaling, and may notify the UE 100*b* thereof.

In Steps S104 and S105, the gNB 200 transmits (for example, broadcasts) MBS traffic through the MTCH in accordance with the MBS configuration of the MBS session configured in Steps S101 and S103. The UEs 100*a* and 100*b* receive the MBS traffic.

Note that when the gNB 200 changes MTCH scheduling, the gNB 200 transmits the changed MTCH scheduling information through broadcast signaling. Thereby, the gNB 200 updates the MBS configuration of the UE 100*a*. When the gNB 200 changes the MTCH scheduling, the gNB 200 transmits the changed MTCH scheduling information to the UE 100*b* through dedicated signaling. Thereby, the gNB 200 updates the MBS configuration of the UE 100*b*.

The dedicated signaling may include timing information indicating a predetermined timing for applying the MTCH scheduling information. In this case, the UE 100*b* applies (or activates) the MTCH scheduling information at the predetermined timing after receiving the dedicated signaling. The predetermined timing may be an absolute time such as a system frame number (SFN), a subframe number, and/or a Global Positioning System (GPS) time; and/or a relative time such as a timer threshold value. When a timer is used, the UE 100*b* starts the timer upon receipt of the dedicated signaling and determines that a time when the timer expires is the predetermined timing. This allows the timing not to deviate between the UEs 100 even when the gNB 200 configures the MTCH scheduling change for each of the plurality of UEs 100 by using the RRC Reconfiguration.

Second Operation Pattern

A second operation pattern according to an embodiment will be described focusing on differences from the above-described operation pattern.

When the gNB 200 provides a plurality of MBS sessions, an MBS session provided in the first delivery mode (for example, a multicast session) and an MBS session provided in the second delivery mode (for example, a broadcast session) may coexist. In this case, it is desirable that the UE 100 can appropriately determine whether to receive a desired MBS session of the UE 100 in one of the first delivery mode and the second delivery mode.

In the second operation pattern according to an embodiment, the gNB 200 transmits, to the UE 100, mode specification information for specifying one of the first delivery mode and the second delivery mode as a delivery mode related to an MBS. The first delivery mode is a delivery mode of transmitting an MBS configuration from the gNB 200 to the UE 100 through dedicated signaling. The second delivery mode is a delivery mode of transmitting an MBS configuration from the gNB 200 to the UE 100 through broadcast signaling.

For example, the gNB 200 transmits MBS session information regarding an MBS session and mode specification information associated with the MBS session information. This allows the UE 100 to appropriately determine whether to receive the desired MBS session of the UE 100 in one of the first delivery mode and the second delivery mode. Specifically, when the UE 100 is interested in receiving the MBS session indicated by the MBS session information received from the gNB 200, the UE 100 receives the MBS configuration in the delivery mode indicated by the mode specification information associated with the MBS session information.

Figure 15:
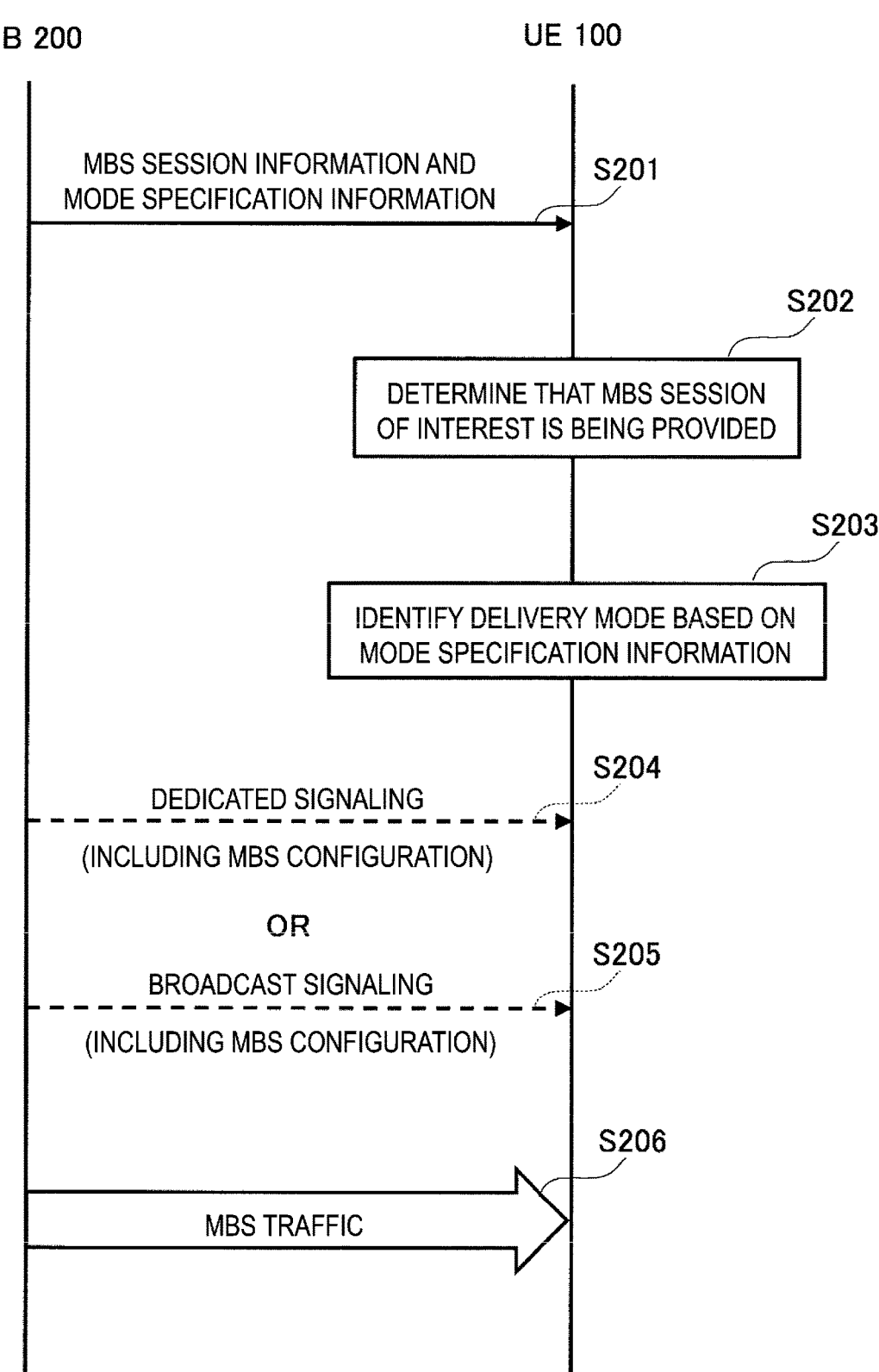
FIG. 15 is a diagram illustrating an operation example of a second operation pattern according to an embodiment.

FIG. 15 is a diagram illustrating an operation example of the second operation pattern according to an embodiment. In FIG. 15, optional steps are illustrated with dashed lines.

As illustrated in FIG. 15, in Step S201, the gNB 200 transmits, to the UE 100, MBS session information regarding an MBS session and mode specification information associated with the MBS session information. The mode specification information may be 1-bit flag information that is, for example, "1" for the first delivery mode and "0" for the second delivery mode. The mode specification information may be implicitly indicated. For example, the mode specification information is not present in the first delivery mode, and the mode specification information is present in the second delivery mode. Conversely, the mode specification information may be present in the first delivery mode, and the mode specification information need not be present in the second delivery mode.

The mode specification information may be information indicating whether the MBS configuration can be received through dedicated signaling or whether the MBS configuration can be received through broadcast signaling, and/or specification (or selection) information indicating through which signaling the UE 100 is to receive the MBS configuration.

Such a set of the MBS session information and the mode specification information is transmitted to the UE 100 by using any message of the SIB, the MCCH, and the RRC Reconfiguration message. One message may include a plurality of the sets of the MBS session information and the mode specification information. That is, the UE 100 may be notified of the mode specification information for each of the plurality of MBS sessions provided by the gNB 200.

When the UE 100 is in the RRC idle state or the RRC inactive state, the MBS session information and the mode specification information can be received through the SIB or the MCCH. When the UE 100 is in the RRC connected state, the UE 100 can receive the MBS session information and the mode specification information through the SIB, the MCCH, or the RRC Reconfiguration message.

In Step S202, the UE 100 determines whether the gNB 200 provides the desired MBS session of the UE 100 based on the MBS session information in the message received in Step S201. When having determined that the gNB 200 provides the desired MBS session of the UE 100, the UE 100 determines whether to receive the desired MBS session of the UE 100 in one of the first delivery mode and the second delivery mode based on the mode specification information in the message received in Step S201 (Step S203).

When having determined to receive the desired MBS session of the UE 100 in the first delivery mode, the UE 100 receives the MBS configuration transmitted from the gNB 200 through dedicated signaling (Step S204). The UE 100 may notify the gNB 200 of the desired MBS session information of the UE 100 to prompt the dedicated signaling transmission. The notification may be the MII described above.

On the other hand, when having determined to receive the desired MBS session of the UE 100 in the second delivery mode, the UE 100 receives the MBS configuration transmitted from the gNB 200 through broadcast signaling (Step S205). It is assumed that this broadcast signaling can be received only in the RRC idle state or the RRC inactive state and that the UE 100 is in the RRC connected state. In such a case, the UE 100 transmits, to the gNB 200, a Release Assistance Indication (RAI) message for transitioning to the RRC idle state or the RRC inactive state. Thus, the UE 100 may receive the broadcast signaling after transitioning to the RRC idle state or the RRC inactive state.

In Step S206, the UE 100 receives MBS traffic (MTCH) of the desired MBS session of the UE 100 based on the MBS configuration received from the gNB 200.

Third Operation Pattern

A third operation pattern according to an embodiment will be described focusing on differences from the above-described operation patterns.

As described above, an MBS session (for example, a multicast session) provided in the first delivery mode and an MBS session (for example, a broadcast session) provided in the second delivery mode may coexist. In such a case, the UE 100 does not know in which delivery mode the desired MBS session of the UE 100 is provided from the gNB 200.

In this operation pattern, the UE 100 first attempts reception of the desired MBS session of the UE 100 in the first delivery mode. When the attempt fails, the UE 100 considers the desired MBS session of the UE 100 to be provided in the second delivery mode and attempts reception of the desired MBS session of the UE 100 in the second delivery mode.

That is, in the third operation pattern according to an embodiment, the UE 100 transmits, to the gNB 200, an MII message including MBS session information regarding the desired MBS session of the UE 100. When having determined not to receive, from the gNB 200, dedicated signaling including an MBS configuration used for reception of the desired MBS session of the UE 100 after transmitting the MII message, the UE 100 attempts reception of broadcast signaling including the MBS configuration.

Here, when not receiving the dedicated signaling including the MBS configuration used for reception of the desired MBS session within a predetermined time after transmitting the MII message, the UE 100 may attempt reception of the broadcast signaling.

When having received, from the gNB 200, information indicating that the MBS configuration used for reception of the desired MBS session is transmitted through broadcast signaling, the UE 100 may attempt reception of the broadcast signaling.

Figure 16:
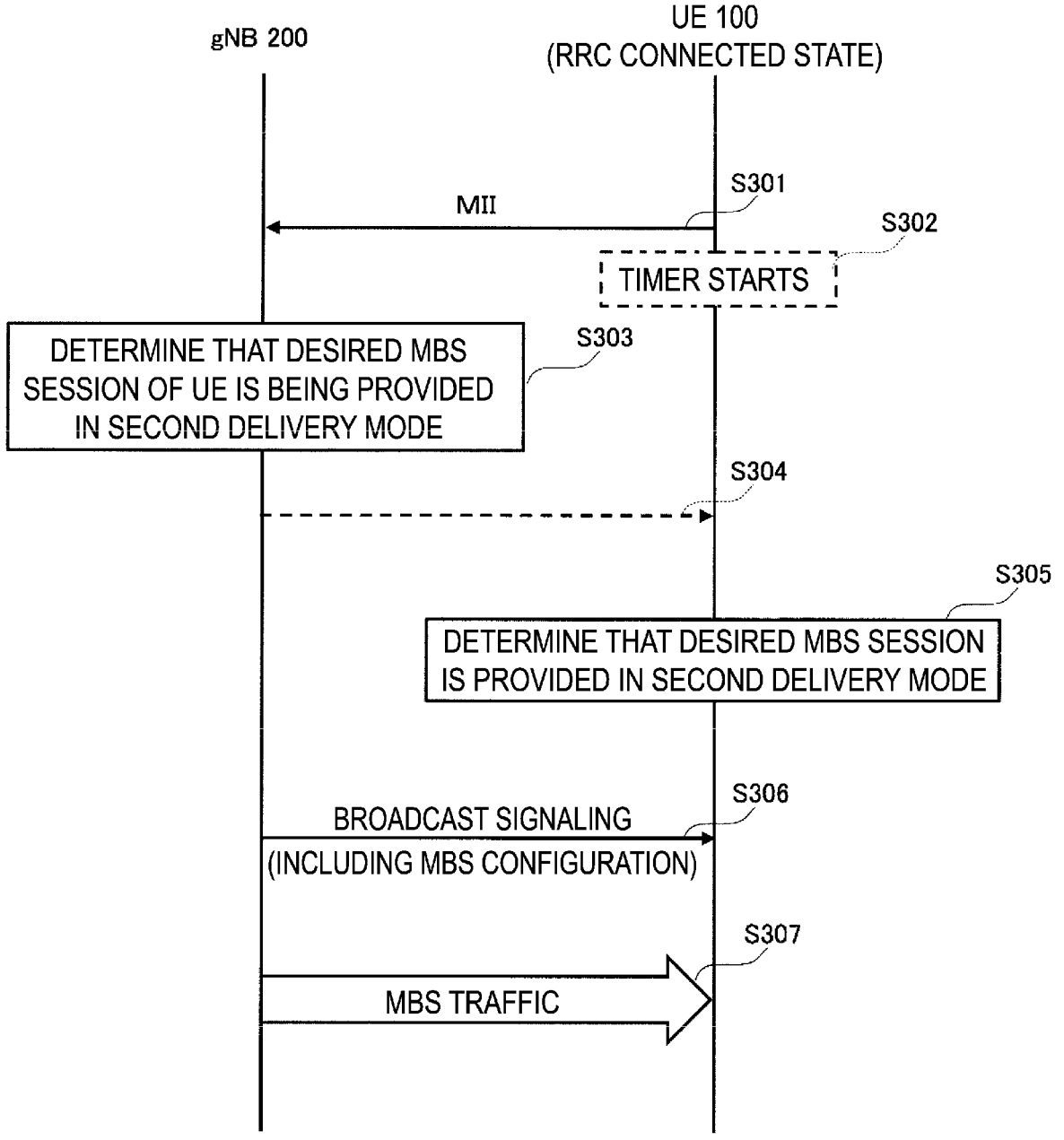
FIG. 16 is a diagram illustrating an operation example of a third operation pattern according to an embodiment.

FIG. 16 is a diagram illustrating an operation example of the third operation pattern according to an embodiment. In FIG. 16, optional steps are illustrated with dashed lines.

In Step S301, the UE 100 in the RRC connected state transmits, to the gNB 200, an MII message including MBS session information regarding a desired MBS session of the UE 100. The gNB 200 recognizes the desired MBS session of the UE 100 by receiving the MII message. The UE 100 may establish a session of the desired MBS session of the UE 100 at an upper layer (NAS) of the UE 100. The AMF may establish a tunnel for the MBS session between the gNB 200 and the UPF.

In Step S302, the UE 100 may start a timer for counting a predetermined time upon transmission of the MII message. The predetermined time (timer value) may be configured in advance in the UE 100 from the gNB 200 or may be a predetermined fixed value (for example, four radio frames).

In Step S303, the gNB 200 determines that the desired MBS session of the UE 100 is being provided in the second delivery mode. When providing the MBS session information in the first delivery mode, the gNB 200 performs the MBS configuration of the first delivery mode for the UE 100 by using an RRC Reconfiguration message. Here, description will be given on the assumption that it has been determined that the desired MBS session is being provided in the second delivery mode.

In Step S304, the gNB 200 transmits, to the UE 100, a notification indicating that the desired MBS session of UE 100 is being provided in the second delivery mode. This notification may be the above-described mode specification information.

In Step S305, the UE 100 determines that the desired MBS session of the UE 100 is provided in the second delivery mode. For example, the UE 100 determines that the desired MBS session is provided in the second delivery mode when not receiving, from the gNB 200, dedicated signaling including the MBS configuration used for reception of the desired MBS session within a predetermined time (during timer operation) after transmitting the MII message. That is, when the timer expires without reception of the dedicated signaling including the MBS configuration used for reception of the desired MBS session, the UE 100 determines that the desired MBS session is provided in the second delivery mode. The UE 100 may determine that the desired MBS session is provided in the second delivery mode based on the notification in Step S304.

In Step S306, the UE 100 receives the MBS configuration transmitted from the gNB 200 through broadcast signaling. It is assumed that this broadcast signaling can be received only in the RRC idle state or the RRC inactive state and that the UE 100 is in the RRC connected state. In such a case, the UE 100 transmits, to the gNB 200, an RAI message for transitioning to the RRC idle state or the RRC inactive state. Thus, the UE 100 may receive the broadcast signaling after transitioning to the RRC idle state or the RRC inactive state.

In Step S307, the UE 100 receives MBS traffic (MTCH) of the desired MBS session of the UE 100 based on the MBS configuration received from the gNB 200 in Step S306.

Fourth Operation Pattern

A fourth operation pattern according to an embodiment will be described focusing on differences from the above-described operation patterns.

As described above, an MBS session (for example, a multicast session) provided in the first delivery mode and an MBS session (for example, a broadcast session) provided in the second delivery mode may coexist. In such a case, the UE 100 does not know in which delivery mode the desired MBS session of the UE 100 is provided from the gNB 200. In the present operation pattern, the UE 100 first attempts reception of the desired MBS session of the UE 100 in the second delivery mode. When this attempt fails, the UE 100 considers the desired MBS session of the UE 100 to be provided in the first delivery mode and attempts reception of the desired MBS session of the UE 100 in the first delivery mode.

That is, in the fourth operation pattern according to an embodiment, the UE 100 attempts reception of broadcast signaling including an MBS configuration used for reception of the desired MBS session of the UE 100. When not receiving the broadcast signaling including the MBS configuration from the gNB 200, the UE 100 transmits, to the gNB 200, an MII message including MBS session information regarding the desired MBS session. This allows the gNB 200 to transmit, to the UE 100, the MBS configuration used for reception of the desired MBS session through dedicated signaling upon receipt of the MII message.

Figure 17:
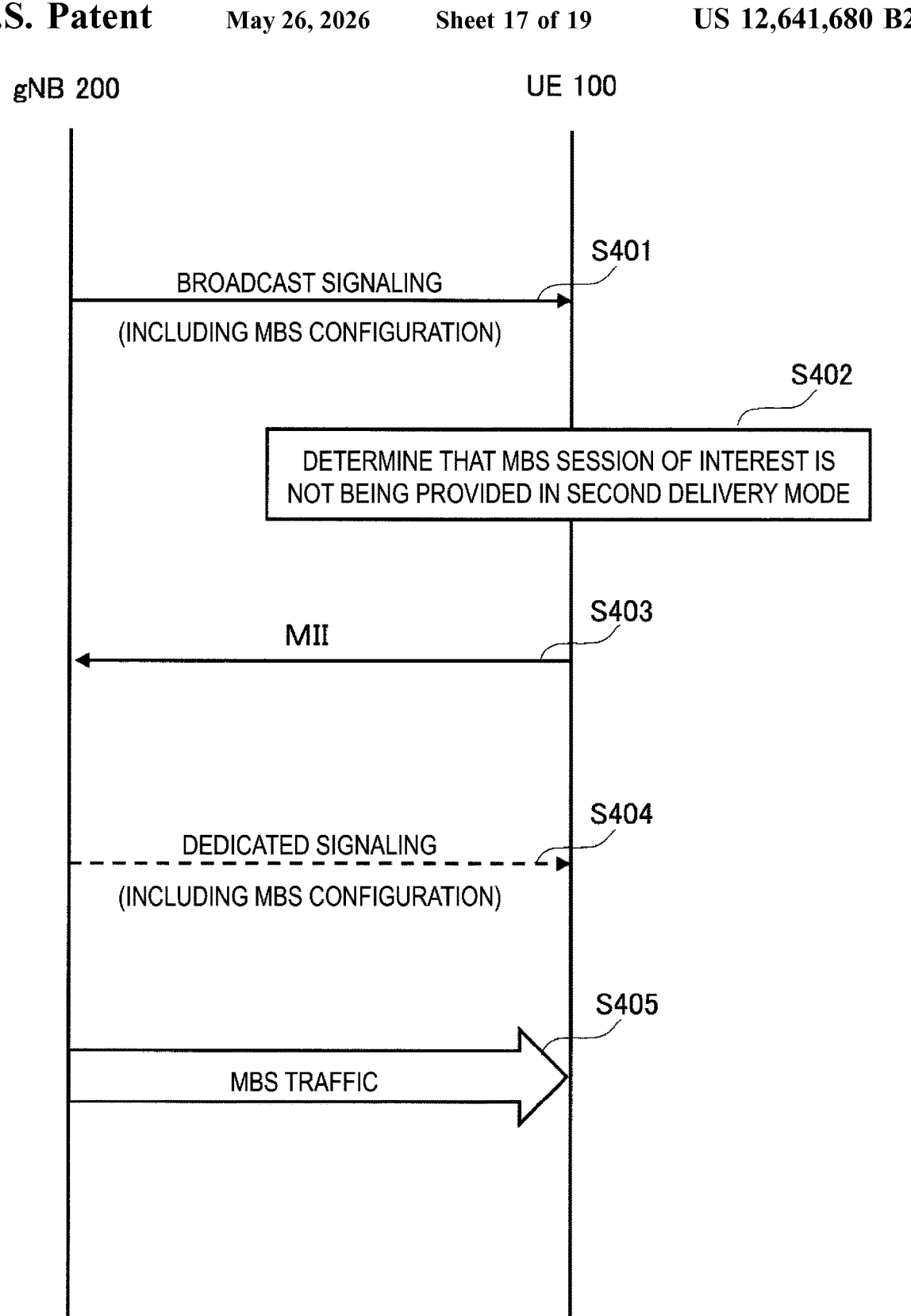
FIG. 17 is a diagram illustrating an operation example of a fourth operation pattern according to an embodiment.

FIG. 17 is a diagram illustrating an operation example of the fourth operation pattern according to an embodiment. In FIG. 17, optional steps are illustrated with dashed lines.

In Step S401, the UE 100 receives broadcast signaling including an MBS configuration from the gNB 200.

In Step S402, the UE 100 determines that a desired MBS session of the UE 100 is not provided in the second delivery mode based on the broadcast signaling received in Step S401. Specifically, the UE 100 determines that the broadcast signaling received in Step S401 does not include MTCH information corresponding to the desired MBS session of the UE 100.

In Step S403, the UE 100 transmits, to the gNB 200, an MII message including MBS session information regarding the desired MBS session of the UE 100. The gNB 200 recognizes the desired MBS session of the UE 100 by receiving the MII message. The UE 100 may establish a session of the desired MBS session of the UE 100 at an upper layer (NAS) of the UE 100. The AMF may establish a tunnel for the MBS session between the gNB 200 and the UPF.

When the UE 100 is in the RRC idle state or the RRC inactive state in Step S401, the UE 100 performs a random access procedure for transitioning from the RRC idle state or the RRC inactive state to the RRC connected state on the gNB 200 prior to Step S403. The UE 100 may notify the gNB 200 of the desired MBS session of the UE 100 using a message (e.g., Msg1, MsgA, Msg3, or Msg5) transmitted during this random access procedure as the MII message.

In Step S404, the gNB 200 transmits, to the UE 100, dedicated signaling including an MBS configuration used for reception of the desired MBS session of the UE 100. The UE 100 receives the MBS configuration through dedicated signaling.

In Step S405, the UE 100 receives MBS traffic (MTCH) of the desired MBS session of the UE 100 based on the MBS configuration received from the gNB 200 in Step S404.

In the present operation pattern, the gNB 200 may notify the UE 100 that the MBS session is not provided instead of the MBS configuration in Step S404. The gNB 200 may instruct the UE 100 to receive the MBS session though unicasting (the PDU session illustrated in FIG. 6). In this case, the UE 100 attempts reception of the MBS session through unicasting illustrated in FIG. 6.

Other Embodiments

The operation patterns described above can be implemented not only separately and independently, but also in combination of some steps of two or more of the operation patterns.

In the embodiments described above, an example in which the base station is an NR base station (gNB) is described; however, the base station may be an LTE base station (eNB). The base station may be a relay node such as an Integrated Access and Backhaul (IAB) node. The base station may be a Distributed Unit (DU) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

Supplementary Note

Introduction

Revised work items have been approved that are related to NR multicast and broadcast services (MBS). It has been agreed that two delivery modes of the MBS are to be introduced as follows.

In Rel-17, R2 defines the following two modes.

1: Delivery mode for high QoS (reliability, delay) requirements available in the connected state (the UE can be switched to another state when no data reception is present, but this is not determined yet).

2: Delivery mode for "low" QoS requirements. The UE can also receive data in the inactive/idle state (details are not determined yet).

R2 assumes that Delivery mode 1 is only used for multicast sessions (in the case of R17).

R2 assumes that Delivery mode 2 is used for broadcast sessions.

The applicability of Delivery mode 2 to multicast sessions needs further study.

No data: When no ongoing data is present in a multicast session, the UE can remain in the RRC connected state. Further study is needed in the other cases.

For Delivery mode 2, an overview of the MBS configuration has been additionally agreed upon as follows.

The UE receives the MBS configuration (in the case of broadcast/Delivery mode 2) through the BCCH and/or MCCH (not yet determined), which can be received in the idle/inactive mode. Further study is needed for the connected mode. The notification mechanism is used to notify a change in the MBS control information.

In this supplementary note, the control plane aspect of the NR MBS is considered in view of the LTE eMBMS mechanism and the latest RAN2 agreement.

Discussion

In accordance with the agreement of RAN2, the two delivery modes at this point are summarized in Table 1.

TABLE 1

|  | Delivery model 1 | Delivery model 2 |
| --- | --- | --- |
| Intended for | Multicast sessions (High QoS requirement) | Broadcast sessions Multicast sessions (FFS) (Low Qos requirement) |
| Data reception in | Connected IDLE/INACTIVE (TBD) | Connected IDLE/ INACTIVE |
| Configuration reception in Configuration signalling by Other |  | Connected (FFS) IDLE/ INACTIVE BCCH MCCH (TBD) A notification mechanism |

Delivery Mode 1 Configuration

Delivery mode 1 is mainly studied for data reception in an RRC connected state, but the configuration aspect thereof is not yet agreed upon. Although it may be very straightforward for an MBS configuration to be provided through RRC reconfiguration, receiving an MCCH in the connected state as in LTE eMBMS is still under study. Considering that Delivery mode 1 is expected for high QoS services, Delivery mode 1 may involve, for example, a PTP/PTM split bearer and/or lossless handover. Since there is no point to these UE-specific configurations when the configurations are provided through the MCCH, the RRC reconfiguration may be used for the configuration of Delivery mode 1 in our view.

Proposal 1: In Delivery mode 1, RAN2 should agree to use the RRC reconfiguration for the MBS configuration.

On the other hand, WID explicitly indicates that the RRC connected state and the RRC idle/inactive state should have maximum commonalities with respect to the MBS configuration as follows, but RAN2 has agreed upon separate delivery modes for multicast and broadcast sessions.

Changes are defined that are used to enable the UE in the RRC idle/inactive state to receive PTM transmission in order to maintain maximum commonalities between the RRC connected state and the RRC idle/inactive state for configuration of PTM reception.

Even when the RRC messages of these delivery modes are different, the structure and IE of the MBS configuration should be adjusted as much as possible between the two delivery modes to achieve the purpose of the WID. For example, the RRC reconfiguration of Delivery mode 1 includes information specific to Delivery mode 1 such as PTP/PTM split bearer and handover related information, in addition to MTCH scheduling information, which is a block common to Delivery mode 2. Details thereof need to be further studied.

Proposal 2: RAN2 should agree to aim for maximum commonalities between the two delivery modes from the viewpoint of the MBS configuration, for example, by using common structures and IEs.

Figure 18:
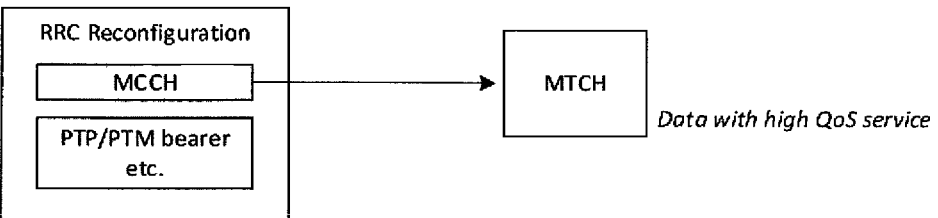
FIG. 18 is a diagram illustrating an example of a structure of a Delivery mode 1 configuration.

Note that the "MCCH" in FIG. 18 refers only to the MTCH scheduling information, i.e., the MTCH configuration associated with the MBS session information. In the case of Delivery mode 1, adjacent cell information is not necessary.

Whether the UE can be released to the idle/inactive state when no ongoing data is present for a multicast session needs further study. In other words, whether the UE in the idle/inactive state can receive the MBS data via Delivery mode 1 needs further study. As agreed upon by RAN2, the baseline is that the UE should remain in the RRC connected state for Delivery mode 1, that is, for multicast sessions requiring high QoS. However, other/exceptional cases are still worth studying.

During e-mail discussions, some companies have pointed out that a network may not be able to keep all of the UEs in the connected state due to congestion. Other companies have also pointed out that the UE does not need to always remain in the connected state for uplink activity, QoS requirements, and/or power consumption of the UE.

From the viewpoint of RAN2, it may be considered beneficial for both the network and the UE to support this functionality. It is assumed that whether/when the UE is released to be inactive depends on the implementation of the gNB and whether the UE is released to be idle depends on the core network. One concern with respect to MBS data reception in the idle state is that the gNB releases the UE context. On the other hand, the UE context is kept inactive. This means that the controllability of the gNB may be lost, which may be contradictory to the concept of general Delivery mode 1. RAN2 should agree that the UE can receive Delivery mode 1 at least in the inactive state, but further study is needed concerning the idle state.

Proposal 3: In Delivery mode 1, RAN2 should agree that the UE can receive Delivery mode 1 at least in the inactive state. Further study is needed concerning the idle state.

When Proposal 3 can be agreed upon, it is not clear how the idle/inactive MBS configuration is provided to the UE. There are three possible options.

Option 1: RRC Reconfiguration

The idle/inactive UE continues to employ the MBS configuration provided through the RRC reconfiguration. This option is simple because the UE only reuses the MBS configuration originally provided for the RRC connected state. However, when transitioning to the idle/inactive state and/or resuming the RRC connected state, some UE operations may need to be studied. For example, how to handle the PTP/PTM split bearer configuration when the configuration is performed.

Option 2: RRC Release

The idle/inactive UE employs the MBS configuration provided through the RRC release. This option is clear but may not be efficient, because it is doubtful whether the MBS configuration is different from the MBS configuration previously provided through the RRC reconfiguration.

Option 3: Switching of the Delivery Mode from Mode 1 to Mode 2

The UE is switched from Delivery mode 1 to Delivery mode 2 before being released to the idle/inactive state. This option is another simple solution since Delivery mode 2 is designed to be able to receive data in all the RRC states as agreed upon by the RAN2. However, it may be expected that packet loss and/or delay will occur during switching, for example, due to acquisition of the MCCH.

Each option has advantages and disadvantages, but in our opinion, Option 1 is slightly more desirable from the viewpoint of simplicity and efficiency. RAN2 should consider the above options but no such limitation is intended, and RAN2 also should discuss a method of providing the Delivery mode 1 configuration for data reception in the idle/inactive state.

Proposal 4: When Proposal 3 can be agreed upon, RAN2 should discuss how the Delivery mode 1 configuration for data reception in the inactive state is provided to the UE.

Delivery Mode 2 Configuration

In the LTE SC-PTM, configurations are provided through two messages, i.e., SIB 20 and SC-MCCH. The SIB 20 provides SC-MCCH scheduling information, and the SC-MCCH provides SC-MTCH scheduling information including the G-RNTI and the TMGI, and neighbor cell information.

Figure 19:
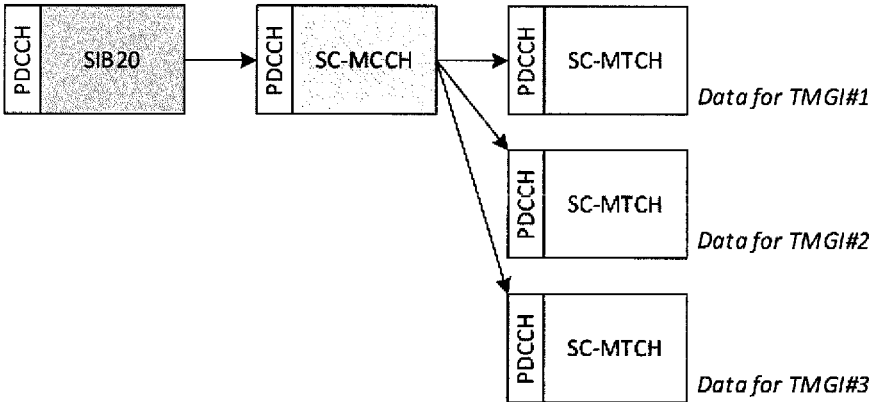
FIG. 19 is a diagram illustrating a two-stage configuration in LTE SC-PTM.

An advantage of the LTE two-stage configuration as illustrated in FIG. 19 is that the SC-MCCH scheduling is independent from the SIB 20 scheduling in terms of repetition period, duration, change period, and the like. The two-stage configuration facilitates frequent scheduling/update of the SC-MCCH, particularly for delay sensitive services and/or UEs that are delayed in participating in the session. According to the WID, one of the applications is group communication or the like, and is thus the same as, and/or similar, to the NR MBS.

Observation 1: In LTE, the two-stage configuration using the SIB 20 and the SC-MCCH is useful for different scheduling operations for these control channels. This is also useful for the NR MBS.

Proposal 5: RAN2 should agree on use of the two-stage configuration with different messages for the NR MBS, such as the SIB 20 and the SC-MCCH for the SC-PTM.

In addition to Proposal 5, the NR MBS is assumed to support various types of use cases described in the WID. It is appreciated that the NR MBS should be appropriately designed for a variety of requirements ranging from delay sensitive applications such as mission critical applications and V2X to delay tolerant applications such as IoT, in addition to the other aspects of requirements ranging from lossless application such as software delivery to UDP type streaming such as IPTV. Some of these services may be covered by Delivery mode 2, while other services with "high QoS requirements" require Delivery mode 1. In this sense, it is beneficial for the gNB to be able to choose use of Delivery mode 2 for multicast sessions.

It is also easy to allow the UE in the RRC connected state to receive the MBS configuration since RAN2 has already agreed to allow data reception in the RRC connected state. It is pointless for the UE having to transition to the idle/inactive state only to acquire the MCCH. Allowing the UE in the connected state to receive the MCCH is easy but may not be optimal in terms of flexibility in scheduling (since the UE may need a "gap") and/or power consumption of the UE (since the UE needs to monitor the "SC-RNTI" in addition to the C-RNTI and G-RNTI). Thus, whether the UE receives the MBS configuration through the MCCH or RRC reconfiguration may need to be discussed further.

These two challenges remain, but in general there seems to be no technical reason to limit them from our viewpoint.

Proposal 6: RAN2 should agree that Delivery mode 2 can be used for multicast sessions in addition to broadcast sessions.

Proposal 7: In Delivery mode 2, RAN2 should agree that the MBS configuration can also be received by the UE in the RRC connected state. Whether the MCCH or RRC reconfiguration is used needs further study.

The control channel in Delivery mode 2 should be designed in consideration of flexibility and the resource efficiency of the control channel in view of Proposal 6. Otherwise, for example, when one control channel includes a configuration of a delay tolerant service and a configuration of a delay sensitive service, the control channel needs to be frequently scheduled in order to satisfy delay requirements from the delay sensitive service. This may cause more signaling overheads.

An object A of the SA2 SI relates to enabling of general MBS services via 5GS, and specified use cases capable of benefiting from this function include (but are not limited to) public safety, mission critical applications, V2X applications, transparent IPv4/IPv6 multicast delivery, IPTV, wireless software delivery, group communications, and IoT applications.

Observation 2: The NR MBS control channel for Delivery mode 2 needs to be flexible and resource efficient with respect to various types of use cases.

As one possibility, as illustrated in FIG. 12, whether configuration channels need to be separated in different use cases is studied. For example, one MCCH frequently provides a delay sensitive service, and another MCCH infrequently provides a delay tolerant service. The LTE SC-PTM is limited in that one cell includes only one SC-MCCH. However, considering that more use cases are assumed than those of LTE, such limitation should be eliminated in the NR MBS in Delivery mode 2. When a plurality of MCCHs are allowed within the cell, each MCCH includes a scheduling configuration with a different repetition period which can be optimized for a specific service. How to identify the MCCH providing a service in which the UE takes interest needs further study.

Proposal 8: In Delivery mode 2, RAN2 should discuss whether a plurality of MCCHs are supported in the cell, which is not supported in LTE.

A new paradigm of NR is support for on-demand SI transmission. This concept may be reused for the MCCH in Delivery mode 2, i.e., on-demand MCCH. For example, the MCCH for delay tolerant services is provided on demand, thus enabling resource consumption for signaling to be optimized. Naturally, the network includes another option for providing the MCCH for delay sensitive services periodically, i.e., not based on a demand.

Proposal 9: Regarding Delivery mode 2, RAN2 should discuss an option when the MCCH is provided on demand, which is not supported by LTE.

As another possibility, as illustrated in FIG. 12, merging the above-described messages, i.e., one-stage configuration, may be studied further. For example, the SIB provides MTCH scheduling information directly, i.e., without the MCCH. This will provide optimization for delay tolerant services and/or power sensitive UEs. For example, the UE may request the SIB (on demand), and the gNB may start providing the SIB and the corresponding service after requests from a plurality of UEs. These UEs do not need to monitor the repeatedly broadcast MCCH.

Proposal 10: Regarding Delivery mode 2, RAN2 should discuss options such as direct provision of the MTCH scheduling information in the SIB when multicast reception with no use of the MCCH (i.e., one-stage configuration) is supported.

Interest Indication/Counting

In LTE eMBMS, in order for the network to perform appropriate determination of MBMS data delivery including start/stop of MBMS sessions, two types of methods of collecting a UE reception/interest service are specified, i.e., MBMS interest indication (MII) and MBMS counting. MII triggered by the UE includes information related to an MBMS frequency of interest, an MBMS service of interest, an MBMS priority, and MBMS reception-only mode (ROM). A counting response triggered by the network via a counting request for a specific MBMS service includes information related to an MBSFN area and an MBMS service of interest.

These methods were introduced for various purposes. MII is mainly used by the network in order to ensure that the UE can continuously receive a service that the UE is interested in while being in the connected state. In contrast, counting is used to enable the network to determine whether a sufficient number of UEs are interested in receiving a service.

Observation 3: In LTE e MBMS, two types of UE assistance information are introduced for different purposes. In other words, MBMS interest indication is introduced for scheduling of NB, and MBMS counting is introduced for session control of MCE.

In a case of NR MBS, multicast services for use cases of group communication and the like are expected, and the network already has full knowledge related to the MBS service that the UE in the connected state is receiving/interested in, and thus assistance information from the UE, such as the network's determination regarding PTP/PTM delivery, is useless to the network. However, our understanding is that the same does not apply to broadcast services and/or the UEs in the idle/inactive state. In a case of broadcast services in particular, NR MBS still has the problem solved by MII and counting in LTE eMBMS, i.e., Observation 3. Thus, in RAN2, whether the assistance information, such as MII and counting, is useful for NR MBS needs to be studied.

As described in WID, since ROM and SFN are not supported in Rel-17, it is noted that MBMS ROM information of MII and information related to the MBSFN area of the counting response are not necessary.

Proposal 11: In RAN2, for example, introduction of the UE assistance information of NR MBS, such as MBS interest indication and/or MBS counting, needs to be agreed upon.

When Proposal 11 can be agreed upon, it is worthwhile to carry out a study on extended functions, in addition to LTE eMBMS. In LTE eMBMS, even when most of the UEs receive broadcast services in the RRC idle state, information of neither MII nor counting can be collected from the UEs in the idle state. To our understanding, this is one remaining problem that LTE eMBMS has from the viewpoint of session control and resource efficiency.

In NR MBS, the same problem may be present in the UEs in the idle/inactive state. For example, the network cannot know whether the UEs in the idle/inactive state are receiving/interested in broadcast services. Thus, the network may continue to provide PTM transmission even when no UEs are being served. If the gNB recognizes interest of the UEs in the idle/inactive state, such unnecessary PTM should be avoided. Conversely, if PTM stops while UEs in the idle/inactive state receiving services are still present, many UEs may simultaneously request connection. This is also undesirable.

Accordingly, it is worthwhile to study whether to introduce a mechanism for collecting the UE assistance information, specifically MBMS counting, from the UE in the idle/inactive state. Needless to say, it is desirable that the UEs in the idle/inactive state be capable of reporting information without transitioning to RRC connected. For example, PRACH resource partitioning associated with the MBS service may be achieved when being introduced to such a report.

Proposal 12: In RAN2, whether the UE assistance information such as MBS counting is also collected from the UE in the idle/inactive state needs to be studied.

The invention claimed is:

1. A communication control method used in a mobile communication system for providing a multicast broadcast service (MBS) from a base station to a user equipment, the communication control method comprising:

transmitting, by the base station through MCCH (Multicast Control Channel), an MBS configuration comprising at least information used for reception of an MBS session for the user equipment in a Radio Resource Control (RRC) inactive state; and transmitting, by the base station to the user equipment in an RRC connected state, at least a part of the MBS configuration through an RRC Release message, wherein the MBS configuration transmitted through the RRC Release message includes notification information indicating not to monitor the MCCH.

2. The communication control method according to claim 1, further comprising:

performing, by the user equipment, an MBS reception by using the MBS configuration transmitted through the RRC Release message.

3. A base station configured to provide a multicast broadcast service (MBS) to a user equipment, the base station comprising:

a transmitter configured to:

transmit, to the user equipment in a Radio Resource Control (RRC) inactive state, an MBS configuration comprising at least information used for reception of an MBS session for the user equipment in the RRC inactive state, through MCCH (Multicast Control Channel); and transmit, to the user equipment in an RRC connected state, at least a part of the MBS configuration through an RRC Release message, wherein the MBS configuration transmitted through the RRC Release message includes notification information indicating not to monitor the MCCH.

4. An apparatus comprising a processor and a memory, the processor configured to control the operations performed by the base station of claim 3.

5. A chipset configured to execute the operations performed by the base station of claim 3.

6. A user equipment configured to receive a multicast broadcast service (MBS) from a base station, the user equipment comprising:

a receiver configured to:

when the user equipment is in a Radio Resource Control (RRC) inactive state, receive, from the base station, an MBS configuration comprising at least information used for reception of an MBS session for the user equipment in the RRC inactive state, through MCCH (Multicast Control Channel); and when the user equipment is in an RRC connected state, receive, from the base station, at least a part of the MBS configuration through an RRC Release message, wherein the MBS configuration transmitted through the RRC Release message includes notification information indicating not to monitor the MCCH.

7. An apparatus comprising a processor and a memory, the processor configured to control the operations performed by the user equipment of claim 6.

8. A chipset configured to execute the operations performed by the user equipment of claim 6.

9. A mobile communication system comprising:

a base station; and a user equipment according to claim 6.

\* \* \* \* \*